United States Patent [19]

Yamamoto

[11] 4,141,039

[45] Feb. 20, 1979

[54] RECORDER MEMORY WITH VARIABLE READ AND WRITE RATES

[75] Inventor: Kaichi Yamamoto, Zama, Japan

[73] Assignee: Sony Corporation, Tokyo, Japan

[21] Appl. No.: 766,746

[22] Filed: Feb. 8, 1977

[30] Foreign Application Priority Data

Feb. 10, 1976 [JP] Japan .................................. 51-13397

[51] Int. Cl.² .............................................. H04N 5/76
[52] U.S. Cl. .......................................... 358/127; 360/8; 179/15.55 T; 365/230; 360/32; 360/36
[58] Field of Search .................... 360/8, 32, 9, 36, 37, 360/19; 179/15.55 T; 358/138, 144, 127; 365/230, 233, 239

[56] References Cited

U.S. PATENT DOCUMENTS

| 3,789,137 | 1/1974 | Newell ........................ 179/15.55 T |
| 3,860,952 | 1/1975 | Tallent ..................................... 360/36 |
| 3,900,887 | 8/1975 | Soga ........................................ 360/32 |
| 3,962,689 | 6/1976 | Brunson ............................... 365/233 |
| 4,030,129 | 6/1977 | Whitlock ................................ 360/32 |

OTHER PUBLICATIONS

"Pulse-Code-Modulation Recording System", by Iwamura et al., J. Audio Eng. Soc.; vol. 21, No. 7, Sep. 1973; pp. 535-541.
"PCM Recorder—A New Type of Audio Magnetic Tape Recorder", by Sato; J. Audio Eng. Soc.; vol. 21, No. 7; Sep. 1973; pp. 542-548.

Primary Examiner—Terrell W. Fears
Assistant Examiner—Alan Faber
Attorney, Agent, or Firm—Lewis H. Eslinger; Alvin Sinderbrand

[57] ABSTRACT

An addressable memory is supplied with pulse coded data at a first rate for writing such data into addressable locations in the memory; and stored data is read out from addressable locations at another rate different from the write-in rate. One advantageous application of such a memory is for changing the time-axis parameter, such as the repetition rate, of data so as to effect time compression and/or expansion. Control over the memory is achieved by generating write clock pulses and read clock pulses at different repetition rates. Data, such as a pulse data bit, is written into an addressable location in the memory during the interval between successive write clock pulses. A data pulse bit is read out of the memory during the interval between successive read clock pulses. The read operation is delayed in the event that it coincides with a write operation. The resultant asynchronous pulse bits which are read out of the memory are reclocked, or synchronized, with the read clock pulses so as to form a synchronous pulse train at the read clock pulse repetition rate.

34 Claims, 58 Drawing Figures

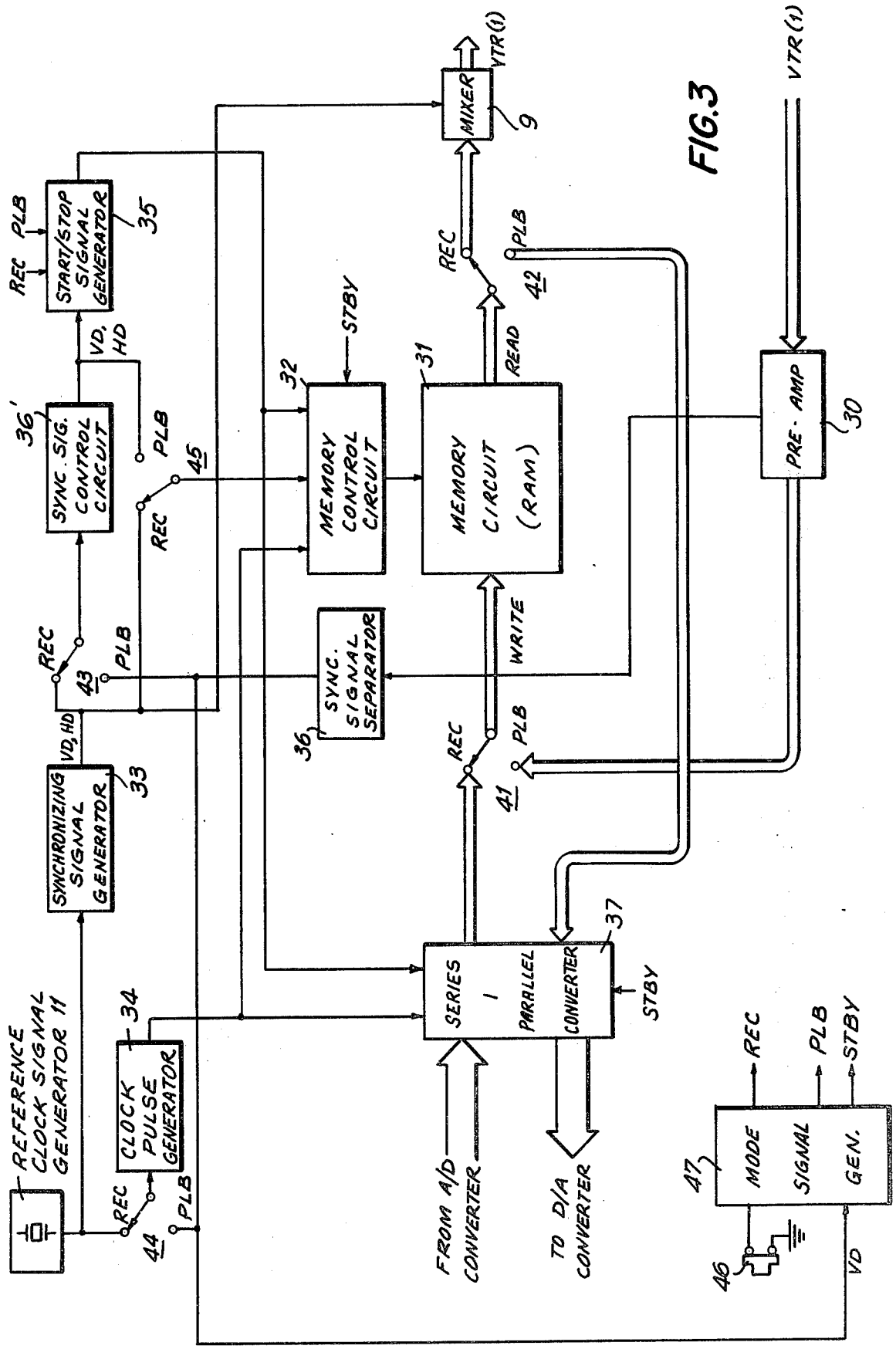

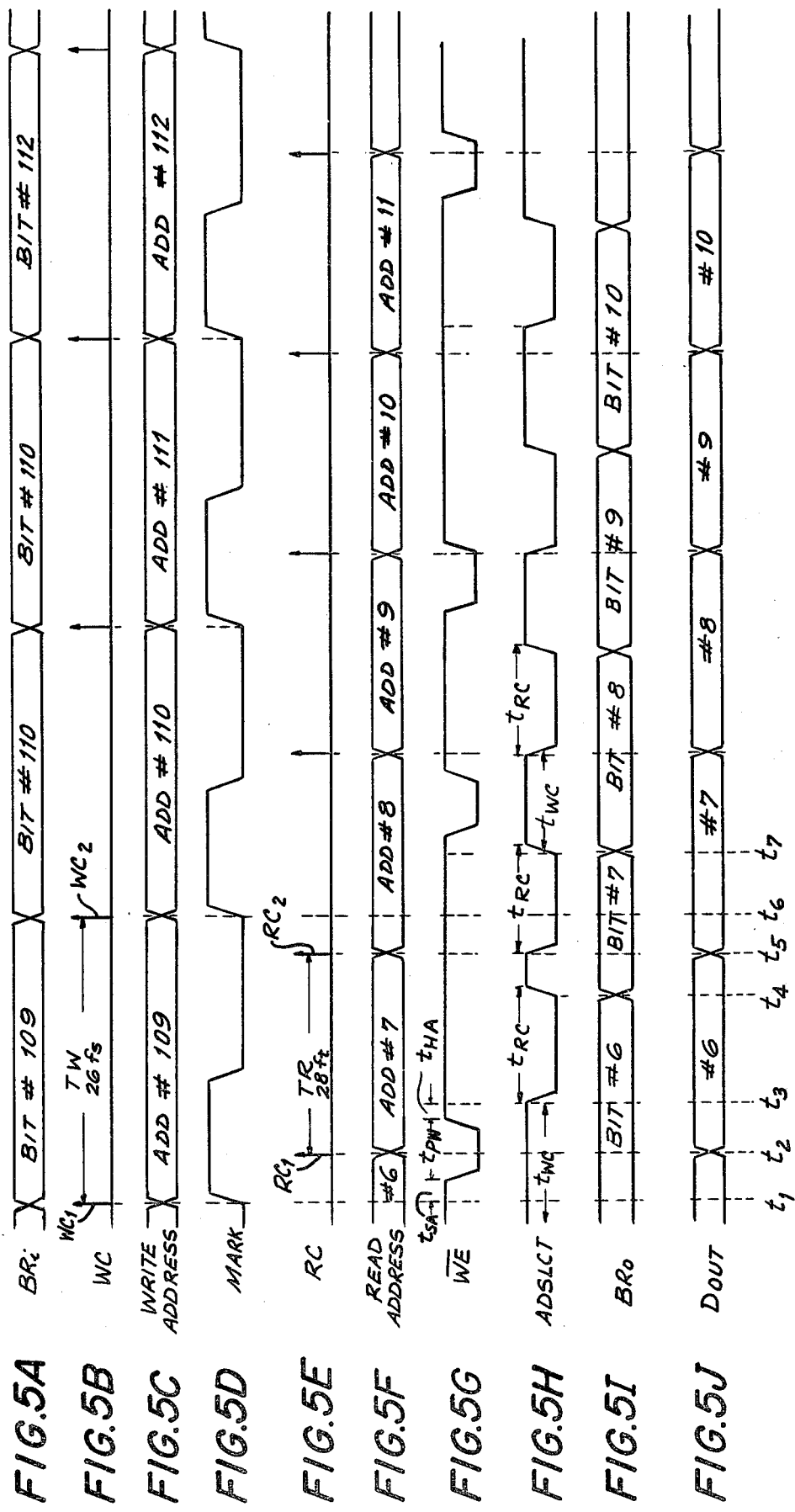

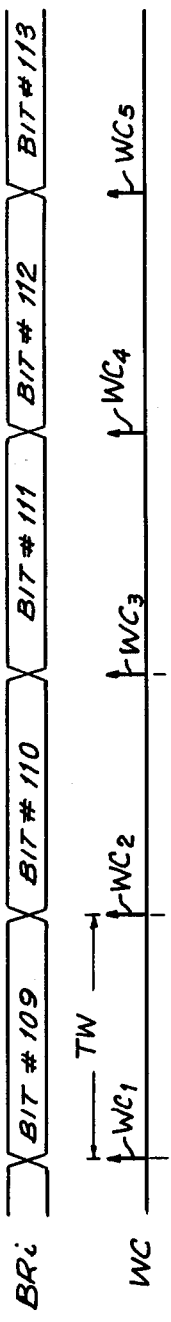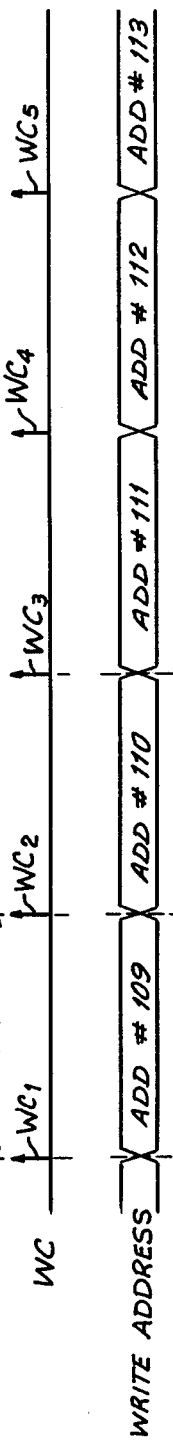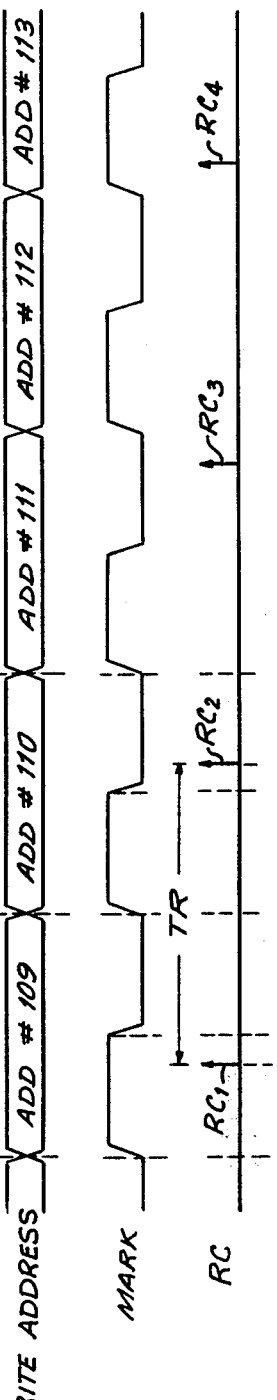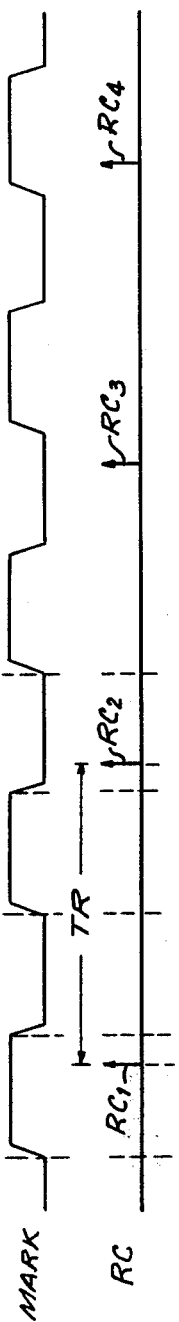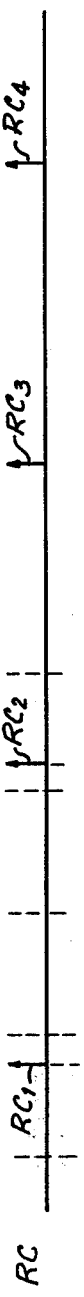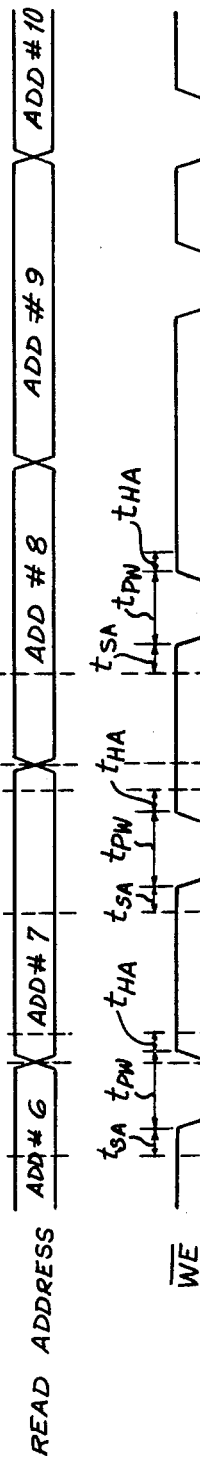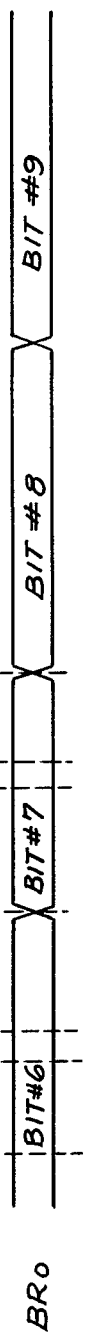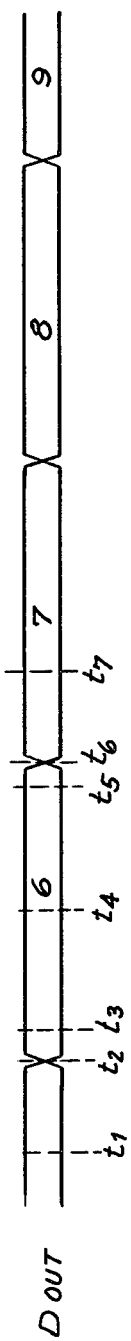

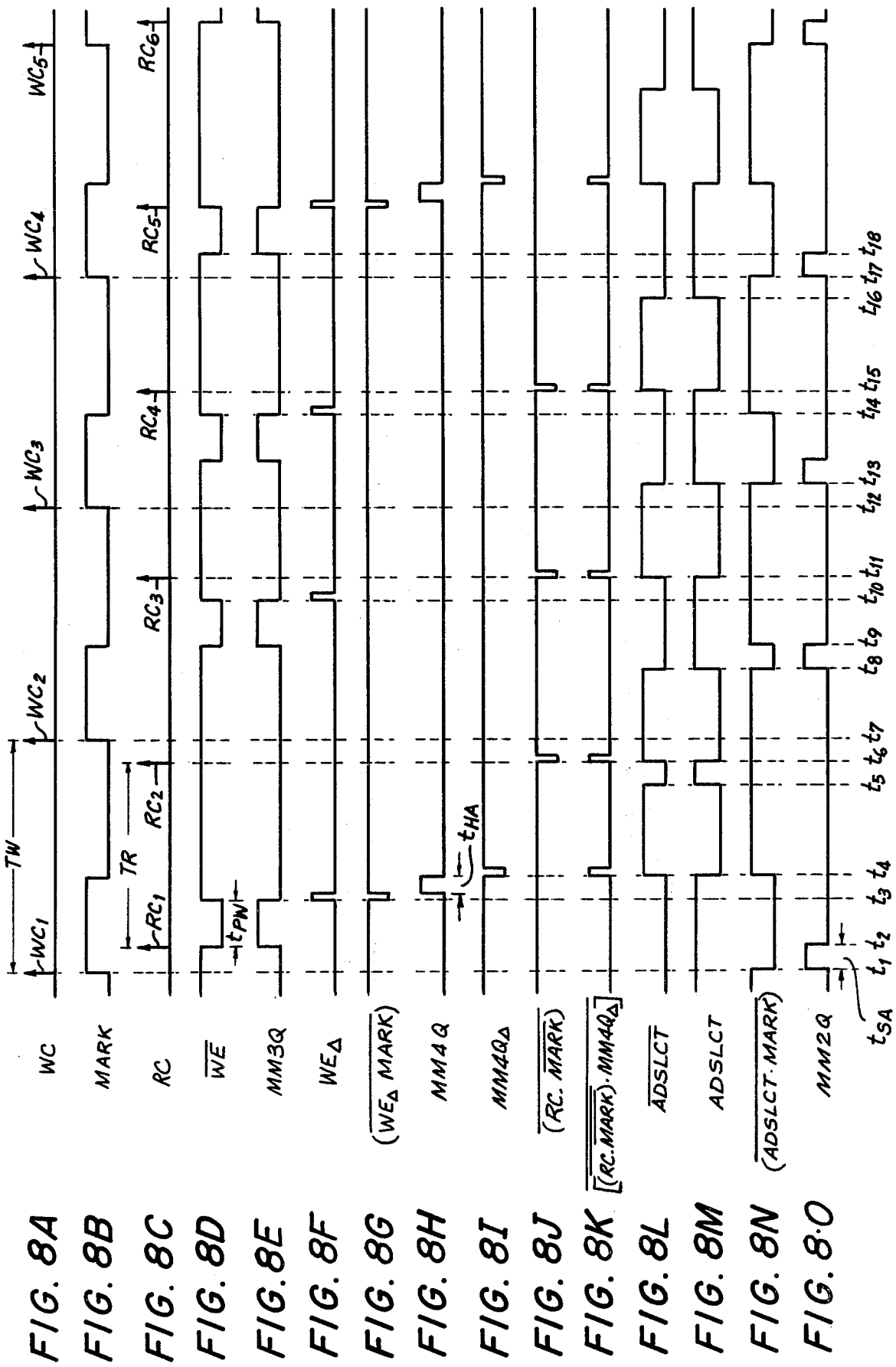

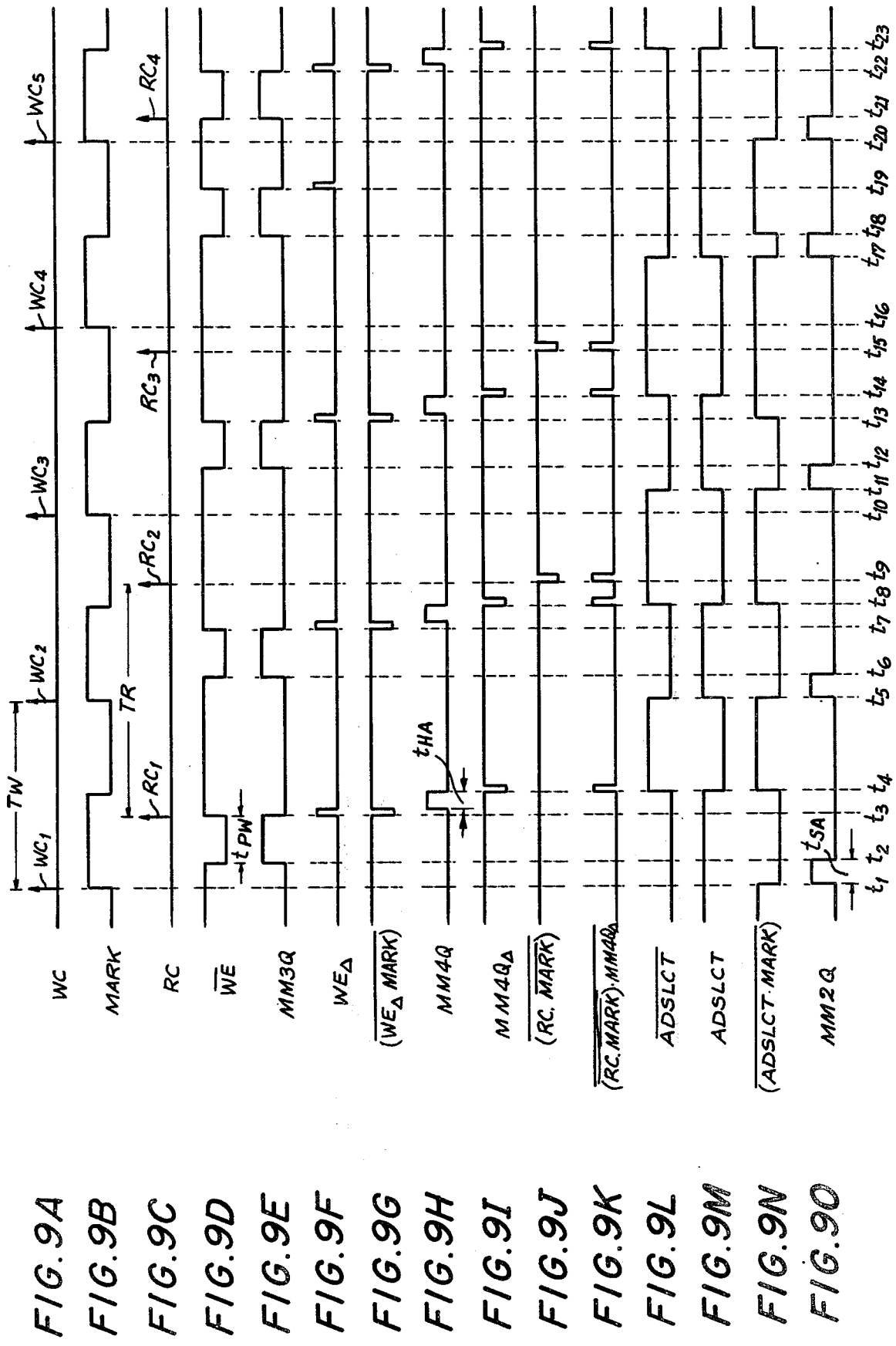

RECORDER MEMORY WITH VARIABLE READ AND WRITE RATES

BACKGROUND OF THE INVENTION

This invention relates to a pulse storage memory and, more particularly, to an addressable memory and a method of and apparatus for controlling that memory. This invention further relates to a particular use of an addressable memory for the purpose of changing the repetition rate of pulse data when such data is recorded on or reproduced from a magnetic medium.

A magnetic video recorder, such as a video tape recorder (VTR) exhibits a sufficiently wide recording bandwidth such that it can be used to record audio signals with extremely high fidelity. A conventional type of VTR, when used to record an NTSC color video signal, records such a signal in parallel slant tracks, each track having a video field recorded therein. In view of the relatively low frequencies of an audio signal, there is a far greater signal storage capacity in each slant track than is needed for the audio signal. Accordingly, it is not advantageous to record an analog audio signal in place of a video signal in the slant tracks of a VTR.

If an audio signal is encoded into a digital signal, such as a PCM data signal, the resultant pulse signals can be processed without a concomittent loss in signal information. That is, the pulse signals can be transmitted or recorded with great accuracy. However, in order to exhibit the necessary high bandwidth for magnetically recording such a pulse signal, suitable magnetic recording equipment heretofore has been very expensive. A VTR of the type now available for home video recording use is far less expensive than professional-type high bandwidth magnetic recording equipment, yet such a VTR offers a satisfactory bandwidth characteristic to permit the magnetic recording of a pulse encoded audio signal.

The recording head or heads of a VTR of the aforementioned type generally is capable of recording a single channel, such as a serial pulse train. Hence, when an audio signal is encoded into pulse form, it is convenient to serialize such a pulse encoded data signal. During recording, the serialized pulse train produced by the pulse encoding device, such as an analog-to-digital converter, need not be of the same repetition rate as the pulse recording frequency. In one example, the pulse recording frequency is a function of the VTR parameters and, therefore, is related to the television synchronizing frequencies, such as the horizontal synchronizing frequency, of the video signal which normally is recorded on the VTR. In such an example, the pulse recording frequency is higher than the serialized encoded pulse repetition rate. Similarly, when a recorded pulse signal is played back from a VTR and is reconverted into an analog audio signal, the pulse reproduction rate generally is greater than the serialized pulse repetition rate which is supplied to a digital-to-analog converter. Hence, to accommodate these different pulse rates, apparatus is needed to compress the time domain of the pulse signals during recording and to expand the time domain of the pulse signals during reproduction.

One technique which heretofore has been used for time compression or expansion has required a plurality of memory devices. Pulses of a first repetition rate are serially written into a first memory by using a write clock pulse signal whose frequency is equal to the input pulse rate. When this first memory has been filled, the stored pulses are transferred to a second memory device at, for example, a read clock pulse rate which differs from the write clock pulse rate, and subsequently the pulse signals stored in the second memory device are read out to the magnetic recording transducers. If this technique is used in combination with a VTR, the capacity of each of the memory devices must be large enough to accommodate all of the pulse signals which are to be recorded in a slant track. This is necessary to avoid any interference between the incoming pulse signals, such as those produced by the analog-to-digital converter, and the outgoing pulse signals, such as those supplied to the VTR, while accommodating the desired compression or expansion of the time domain. In view of this very high memory storage capacity needed by the aforementioned technique, the cost of such memory devices is extremely high. Hence, this technique generally is economically useful only for the time-compression or -expansion of a small number of data pulses.

Another technique for changing the time domain of a pulse signal relies upon a shift register of the so-called "first-in, first-out" type wherein write and read operations can be performed on the shift register simultaneously. However, such a shift register is quite expensive such that its cost per bit renders it economically undesirable. Also, the control circuitry which must be used with such a shift register adds to the overall cost in carrying out this technique.

OBJECTS OF THE INVENTION

Therefore, it is an object of the present invention to provide improved apparatus and a method of using same for varying the time domain of a pulse signal, whereby the aforenoted disadvantages are avoided.

Another object of this invention is to provide an improved memory circuit and memory control apparatus which is useful in compressing or expanding the time domain of a pulse signal applied thereto.

A memory circuit which is useful for this application is an addressable memory, such as a random access memory (RAM). In a RAM, pulse signals may be written into addressed locations at a write clock pulse rate and stored pulse signals may be read from different addressed locations at a read clock pulse rate, the write and read clock pulse rates being different from each other. Hence, if the read clock pulse rate exceeds the write clock pulse rate, time compression is achieved. Conversely, if the write clock pulse rate exceeds the read clock pulse rate, then time expansion is achieved.

Therefore, a further object of this invention is to provide an addressable memory and a method of and apparatus for controlling that memory for the purpose of varying the time domain of pulse signals applied thereto.

When using a RAM, write and read operations generally can be interleaved. Hence, during a given time duration during which may write and read cycles are performed, it would appear that the write and read operations are carried out substantially simultaneously. However, since the write operation is performed at one rate and the read operation is performed at another rate, it is possible that some instant will be reached when a write and read operation occur simultaneously in time.

Therefore, it is yet another object of this invention to provide a method of and apparatus for controlling an addressable memory for writing in and reading out data therefrom whereby write and read operations can be performed during successive write and read intervals, but the simultaneous occurrence of such operations is prevented.

An additional object of this invention is to provide a method of and apparatus for controlling an addressable memory into which pulse data is written during a write cycle which can occur during periodic write intervals and from which data is read during a read cycle which can occur during periodic read intervals, the relative occurrence of a write cycle or a read cycle being delayed in the event that the other is present.

A still further object of this invention is to provide an improved method of and apparatus for controlling a relatively inexpensive, low capacity addressable memory for the purpose of changing the time domain of a pulse signal which is recorded on or reproduced from a slant track on a magnetic medium by a magnetic video recording device.

Various other objects, advantages and features of the present invention will become readily apparent from the ensuing detailed description, and the novel features will be particularly pointed out in the appended claims.

SUMMARY OF THE INVENTION

In accordance with the present invention, an addressable memory is provided together with apparatus for controlling that memory such that pulse data at a first rate is written into selected ones of the memory addresses and pulse data at a second rate is read out from different memory addresses. A clock pulse generator generates periodic write clock pulses at a write clock rate and read clock pulses at a periodic read clock rate. The write clock pulses are used to generate successive memory addresses into which pulse data is to be written; and the read clock pulses are used to generate successive memory addresses from which stored pulse data is to be read. A write-in circuit generates a write-in cycle during the interval between successive write clock pulses; and a read-out circuit generates a read out cycle during the interval between successive read clock pulses. A control circuit detects whether a write-in and read-out cycle will coincide, and is operable to selectively delay one or the other of the write-in and read-out cycles during its respective interval.

The present invention also relates to a method of controlling an addressable memory such that pulse data can be written into addressed memory locations substantially independently of the reading out of pulse data, that is, either a write-in or read-out operation can be performed irrespective of the particular operation that had been performed previously.

In accordance with another feature of this invention, an addressable memory and memory control circuit are used in combination to achieve compression or expansion of the time domain of input pulse data. A useful application of this feature is to record and reproduce pulse data on a conventional type magnetic video recorder.

BRIEF DESCRIPTION OF THE DRAWINGS

The following detailed description, given by way of example, will best be understood in conjunction with the accompanying drawings, wherein:

FIG. 3 is a block diagram showing a portion of the system of FIG. 1 in greater detail;

FIGS. 5A-5J are waveform diagrams which are useful in explaining the operation of the memory and memory control apparatus during a signal recording operation, for example;

FIGS. 6A-6J are waveform diagrams which are useful in explaining the operation of the memory and memory control apparatus during a signal reproducing operation;

FIGS. 8A-8O are waveform diagrams which are useful in explaining the operation of the circuit shown in FIG. 7 during a signal recording operation, for example; and FIGS. 9A-9O are waveform diagrams which are useful in explaining the operation of the circuit shown in FIG. 7 during a signal reproducing operation.

DETAILED DESCRIPTION OF A PREFERRED EMBODIMENT

Overall System

Figure 1:
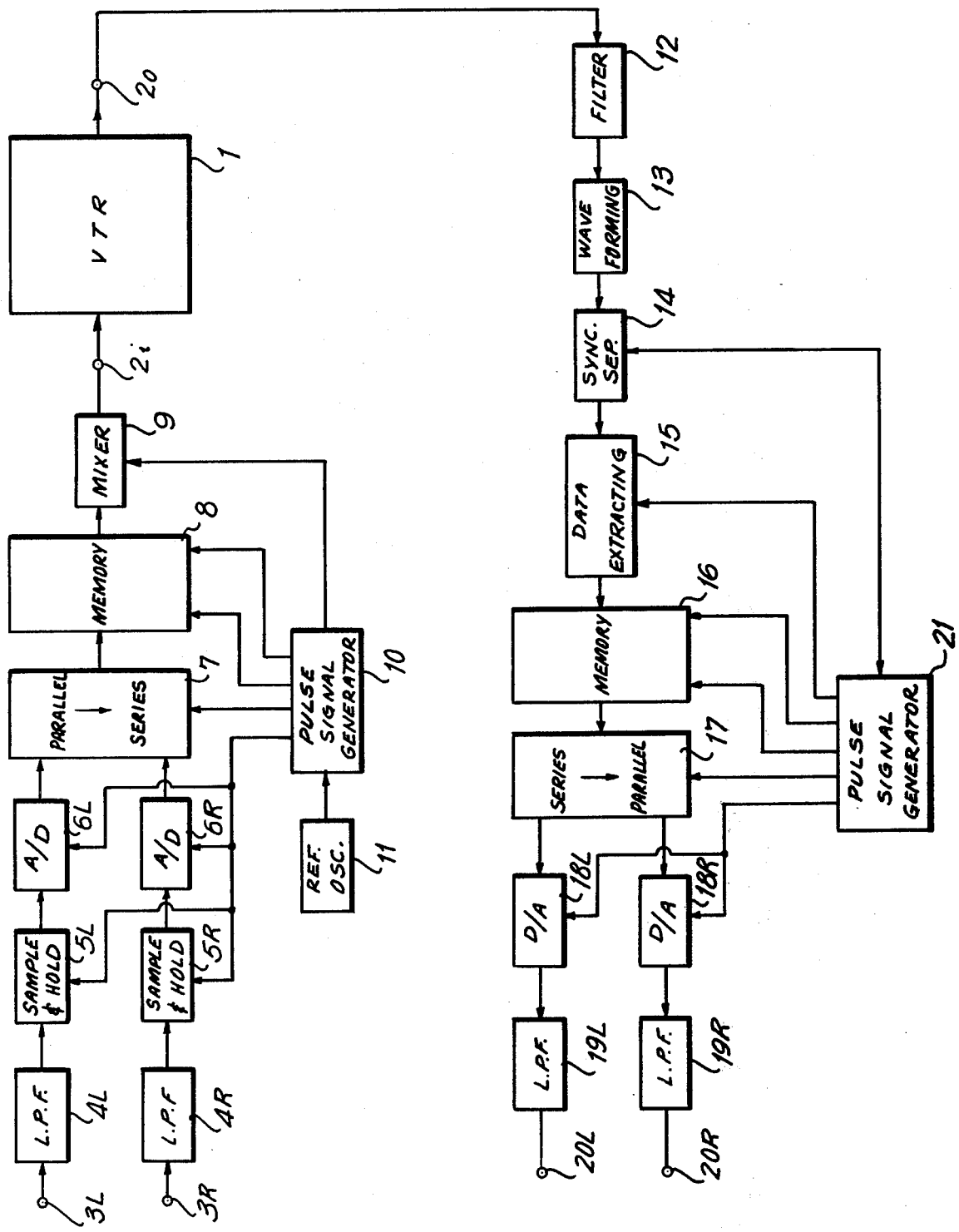
FIG. 1 is an overall system block diagram wherein the present invention finds ready application.

Referring now to the drawings, and in particular to FIG. 1, there is illustrated a block diagram of one embodiment of apparatus which can be used to record signals, and particularly pulse signals, onto a magnetic video recorder, such as a video tape recorder (VTR) 1, and to produce such signals therefrom. As is known, VTR 1 is adapted for normal operation to record and play back video signals. For this purpose, VTR 1 includes circuitry that utilizes the synchronizing signals normally accompanying a video signal to particularly control a recording and a playback operation. As one example, VTR 1 is of the type having two rotary heads spaced 180° apart that scan successive slant tracks across magnetic tape, each such track having one field of an NTSC signal recorded therein. Such a VTR has a bandwidth that is sufficiently wide so as to be capable of recording pulse signals in the slant tracks. Since, in the conventional VTR, each rotary head records and reproduces a serial signal, these heads can be used to record and reproduce pulse signals in serial form. While these pulse signals can, of course, represent a wide variety of data, or information, the system shown in FIG. 1 will be described for the application wherein analog audio signals are represented by pulse signals. This can be achieved by sampling audio signals, for example, left and right stereo signals, and suitably encoding each sample, as by pulse code modulation (PCM) encoding.

In order to understand better the following description and appreciate the improvements achieved by the system of FIG. 1, an explanation of preferred parameters now is given. Practically, VTR 1 is capable of recording 1,400,000 bits per second (1.4M bit/sec.), thus having a pulse signal recording rate corresponding to 1.4 MHz. If the audio signal is to be enabled to undergo a dynamic range of 90dB for high fidelity recording, a sampled signal should be encoded with 13 bits. Hence, if left and right stereo signals are contemplated, then each digital word is comprised of 26 bits (13 bits per channel). Now, in a conventional VTR, it is convenient for the frequency of the signal that is recorded to be related to the horizontal synchronizing signal frequency $f_h$ so that the recording signal frequency $f_t = n f_h$, where n is an integer, but $f_t < 1.4 \times 10^6/26$ or $f_t$ should be less than 53.85 KHz. Also, each slant track has one field of a video signal recorded therein, and each field is comprised of 262.5 horizontal line intervals. However, useful information, that is, pulse encoded audio information, is not recorded during the vertical synchronizing interval which, generally, is comprised of about twenty horizontal line intervals (20H).

If it is assumed that the maximum frequency in the audio signal to be recorded is approximately 20 KHz, then the minimum sampling frequency $f_s$ necessary to encode this audio signal is twice the maximum frequency, or 40 KHz. Therefore, the minimum recording signal frequency should be greater than the ratio between the number of horizontal line intervals in a field and the number of useful horizontal line intervals in that field, times the minimum sampling frequency, that is, $f_t > (262.5/262.5-20) \times 40 \times 10^3$ or $f_t > 43.3$ KHz. The following summary of the foregoing conditions 43.3 KHz $< (f_t = nf_h) <$ 53.85 KHz is satisfied by:

$$f_t = 3f_h = 3 \times 15.75 \text{ KHz} = 47.25 \text{ KHz}.$$

Consistent with this expression, the sampling frequency $f_s$ may be expressed as $f_s = (262.5-20/262.5) \times f_t =$ 43.65 KHz. However, the sampling frequency $f_s$ should be related to the recording signal frequency $f_t$ by an integral number. If $f_t/f_s = 15/14$, as an example, then $f_s$ = 44.1 KHz. Thus, the number of samples N recorded in each field is equal to the sampling frequency $f_s$ divided by the duration of a field, $N = 44.1 \times 10^3/60 =$ 735. As mentioned above, each sample is formed of a 26-bit word with 13 bits representing the left-channel audio signal and 13 bits representing the right-channel, audio signal of a stereo signal. Also, three words (or three left and right channel samples) are provided during each horizontal line interval. Hence, the number of horizontal line intervals during each field that are occupied by pulse encoded audio signals is equal to 735/3, or 245 lines intervals. Thus, the vertical blanking interval in each field should be 262.5−245 =17.5H, or 17.5 horizontal line intervals.

The apparatus of FIG. 1 operates with the foregoing parameters to record pulse encoded audio signals on a magnetic medium and to reproduce such signals therefrom. As shown, the system includes a recording channel comprised of a low-pass filter 4L, a sampling circuit 5L, an analog-to-digital (A/D) converter 6L and a parallel-to-serial converter 7 for the left channel and a low-pass filter 4R, a sampling circuit 5R, an analog-to-digital (A/D) converter 6R and parallel-to-serial converter 7 for the right channel. The system also includes a reproducing channel comprised of a serial-to-parallel converter 17, digital-to-analog (D/A) converter 18L and low-pass filter 19L for the left channel and serial-to-parallel converter 17, a digital-to-analog (D/A) converter 18R and a low-pass filter 19R for the right channel. As may be appreciated, the recording channel is adapted to supply the pulse encoded audio signals (hereinafter, pulse signals) to VTR 1 for recording, while the reproducing channel is adapted to supply the pulse signals reproduced by VTR 1 to suitable sound reproduction devices (not shown). To accommodate the different sampling and recording frequencies $f_s$ and $f_t$, respectively, a memory device 8 is provided between the recording channel and the VTR, while a memory device 16 is provided between the VTR and the reproducing channel. In a practical embodiment, both memory devices are combined into a single addressable memory, such as a random access memory (RAM) that is used selectively during a recording or reproducing operation.

Low-pass filter 4L is coupled to an audio input terminal 3L to receive the left-channel audio signal and to supply this audio signal to sampling circuit 5L. As one example, the sampling circuit is a sample-and-hold circuit responsive to sampling signals of frequency $f_s$ produced by pulse generator 10 to produce periodic amplitude samples of the audio signal. These samples are applied to A/D converter 6L which produces a pulse encoded representation, for example, a parallel 13-bit signal, of the analog sample. These parallel bits are supplied to parallel-to-serial converter 7 for serialization. Similarly, the right-channel audio signal is received by an audio input terminal 3R, and low-pass filter 4R, sampling circuit 5R and A/D converter 6R function to supply a 13-bit pulse encoded representation of the right-channel audio signal sample to parallel-to-serial converter 7. Although not shown in detail, it is apparent that the parallel-to-serial converter is controlled by clock pulses applied thereto by pulse generator 10 for producing the 13 serialized bits of one channel, for example, the left channel, followed by the 13 serialized bits of the other channel.

The pulses produced by parallel-to-serial converter 7 are supplied to memory 7 to be written into addressed locations therein in response to write pulses derived from pulse generator 10. In a preferred embodiment described below, the memory is a RAM and each pulse is stored in a separately addressed location. Thus, the block designated "memory" also includes suitable control circuitry.

Since the sampling rate $f_s$ is less than the signal recording frequency $f_t$, memory 8 functions to vary the time domain of the pulse signals so as to adapt the pulse signals for recording. That is, these pulse signals are subjected to a time-compression operation. To this effect, the pulse signals previously stored in memory 8 are read out from their addressable locations in response to read pulses derived from pulse generator 10, and then supplied through a mixer circuit 9 to VTR 1. The purpose of the mixer circuit is to add the usual video synchronizing signals to the pulse signals read out of memory 8, thereby enabling VTR 1 to be controlled in its operation in the usual manner, which is known to the television art and need not be explained herein.

Pulse generator 10 is a timing circuit to which reference clock pulses, such as produced by reference oscillator 11, are supplied, these reference clock pulses being used to generate the aforementioned sampling pulses, converter control pulses, memory write and read pulses, and video synchronizing pulses.

Figure 2A:
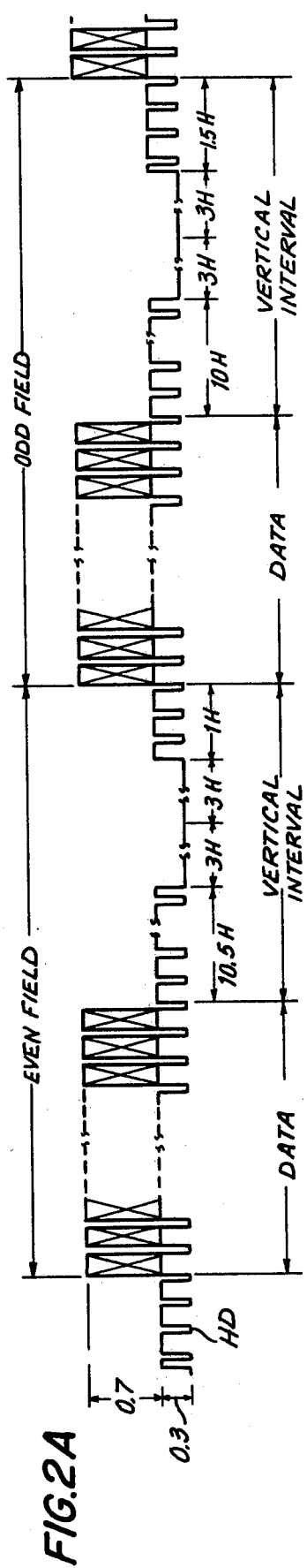
FIGS. 2A-2C are waveform diagrams representing how the system of FIG. 1 operates.

The format in which the pulse encoded audio signals are recorded by VTR 1 is shown in FIG. 2A. One complete frame is shown as being comprised of an even field followed by an odd field, the fields being separated by the vertical blanking interval, as is conventional for a video signal. This vertical blanking interval usually includes 10 or 10.5 horizontal line intervals which are provided with no video information, then a period of equalizing pulses occupying 3 horizontal line intervals, then a period of vertical synchronizing pulses occupying another 3 line intervals, followed by another period of equalizing pulses and 1.5 or 1 line intervals which are provided with no video information. Thus, a conventional video signal has a vertical blanking interval of 20 horizontal line intervals. The duration defined by the first 10 or 10.5 line intervals in the vertical blanking interval is used by VTR 1 for head switch-over; that is, switching from one rotary head to the other. Usually, the second set of equalizing pulses is used to define the video retrace interval. However, when VTR 1 is used to record audio information, this second set of equalizing pulses is not necessary. Hence, the vertical blanking interval can be shortened by three line intervals, thus extending the time during which useful information (i.e., audio information) can be recorded.

Therefore, as shown in FIG. 2A, the pulse encoded audio signals are recorded in an "even" field in a slant track by VTR 1, followed by a vertical blanking interval formed of 10.5 line intervals followed by 3 line intervals of equalizing pulses and 3 line intervals of vertical synchronizing pulses and then 1 line interval. Succeeding this vertical blanking interval is the "odd" field of pulse encoded audio signals, followed by a vertical blanking interval formed of 10 line intervals, then 3 line intervals of equalizing pulses, 3 line intervals of vertical synchronizing pulses and then 1.5 line intervals. In both the "even" and "odd" fields, the pulse signals are recorded as 735 successive words, each word being formed of 26 bits to represent the left and right channel samples, and 3 words being provided during each horizontal line interval. While these words are recorded similarly in each field, the "even" field of pulse data follows the vertical synchronizing pulses by 1.5 line intervals, while the "odd" field of pulse data follows the vertical synchronizing pulses by 1 line interval.

Figure 2B:
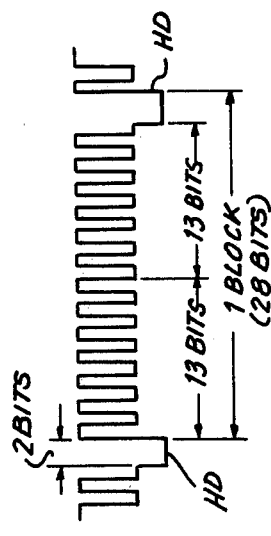

As shown in greater detail in FIG. 2B, successive words are separated by synchronizing pulses $H_D$. These synchronizing pulses resemble horizontal synchronizing pulses, but are of three times the horizontal synchronizing frequency $f_h$. Synchronizing pulses $H_D$ are of a duration equal to two data bits and are of a period that is one-third the line interval. The synchronizing pulses are produced by pulse generator 10 as aforesaid, and are less than the pulse amplitude of the pulse encoded audio information. In one example the ratio of synchronizing pulse level $H_D$ to data pulse level is 3:7, with the synchronizing pulses being negative. For the purpose of simplification, the pulse data shown in FIG. 2B is assumed to be formed of alternating 1's and 0's.

Figure 2C:
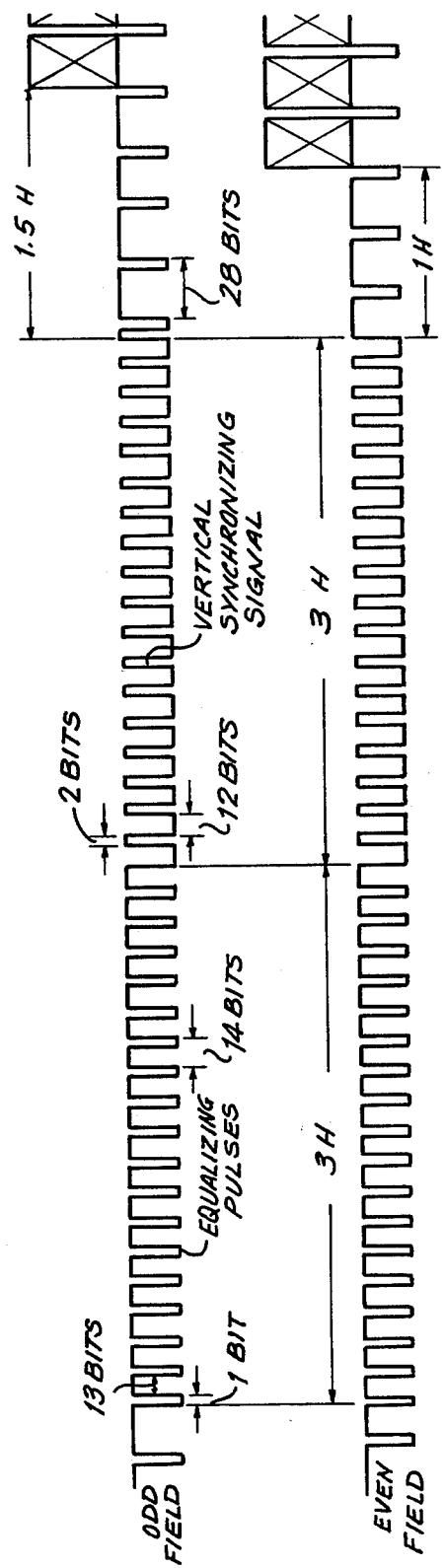

In a conventional video signal, the equalizing pulses are negative and are twice the frequency of the horizontal synchronizing pulses. The vertical synchronizing pulses also are twice the frequency of the horizontal synchronizing pulses, but are positive. Consistent with this video signal format, the equalizing pulses here recorded on VTR 1 are negative and are twice the frequency of the synchronizing pulses $H_D$; while the vertical synchronizing pulses are positive and are twice the frequency of synchronizing pulses $H_D$, as shown in FIG. 2C. The width of each equalizing pulse is equal to 1-bit width, and the width of each vertical synchronizing pulse is equal to 2-bit widths.

The signal format of the pulse encoded audio signals, as shown in FIGS. 2A–2C, is very similar to that of a conventional video signal and, therefore, readily can be recorded by VTR 1. That is, the VTR includes servo control apparatus which is responsive to the vertical synchronizing signal for controlling the rotation of the magnetic heads and the movement of tape and time-base error correcting circuitry which is responsive to the horizontal synchronizing signal to correct for time-base error during signal playback. This apparatus and circuitry likewise respond to the vertical synchronizing signals and synchronizing pulses $H_D$ which are provided with the pulse encoded audio signals, as shown in FIGS. 2A–2C.

In view of the foregoing, if the pulse signals were recorded at the same rate at which they are produced, the fact that the audio signal is continuous means that there would not be any available interval to insert the aforementioned vertical synchronizing signal. Rather, a portion of the audio information would have to be replaced by the vertical synchronizing signal, thus degrading the quality of the audio information which is reproduced. However, since time compression of the pulse signals is achieved by the operation of memory 8, a suitable interval is provided within which the vertical synchronizing signal can be inserted without impairing the audio information.

Returning to FIG. 1, after the aforedescribed pulse-encoded audio signal is recorded by VTR 1, it may be reproduced subsequently. For this purpose, the reproducing channel is shown connected to an output terminal $2_0$ of the VTR. This reproducing channel may be in combination with the illustrated recording channel, or it may form separate apparatus. In addition to memory 16, serial-to-parallel converter 17, D/A converters 18 and low-pass filters 19, described above, the reproducing channel also includes a filter 12 coupled to VTR output $2_0$ for removing noise components in the reproduced pulse signals, a wave shaping circuit 13 coupled to filter 12 for reshaping the pulse signals, a synchronizing signal separator circuit 14 coupled to wave shaping circuit 13 for separating the synchronizing signals from the reproduced pulse signals, and a data extracting circuit 15 coupled to separator circuit 14 for passing, or transmitting, the data pulses to memory 16. A pulse generator 21 is coupled to separator circuit 14 for sensing the synchronizing signals and for generating various timing signals in response thereto. As illustrated, these timing pulses are applied to data extracting circuit 15, memory 16, serial-to-parallel converter 17 and D/A converters 18.

In operation, VTR 1 reproduces the pulse signals recorded in the slant tracks, as shown in FIGS. 2A–2C, at the same rate as the signal recording rate. Synchronizing signal separator circuit 14 and data extracting circuit 15 remove synchronizing pulses $H_D$ and those pulses in the vertical blanking interval occupying the 17.5 horizontal line intervals, illustrated in FIGS. 2A and 2C. The resultant pulse data signal thus includes a gap between fields of useful pulse signals. Memory 16 writes these pulse signals into addressable locations therein at the pulse playback rate, and reads them out at the original sampling rate as determined by timing pulses applied by pulse generator 21. Hence, time expansion of the reproduced pulse signals is achieved, effectively "stretching" the duration of each data word to be the same as that produced originally by parallel-to-serial converter 7.

The time-expanded serialized pulse signals read out of memory 16 are converted to parallel form by serial-to-parallel converter 17, and the left channel (13-bit) encoded audio signal is converted to analog form by D/A converter 18L while the right channel (13-bit) encoded audio signal is converted to analog form by D/A converter 18R. After filtering in low-pass filters 19L and 19R, the left channel audio signal is provided at output terminal 20L and the right channel audio signal is provided at output terminal 20R.

Memory 16 is controlled by timing pulses generated by pulse generator 21 which are derived from the reproduced synchronizing signals, including synchronizing pulses $H_D$. Accordingly, if there is any time-base error in the reproduced signals, such as jitter, this time-base error is accounted for when the pulse signals are written into the memory. Such time-base error therefore is substantially removed.

Hence, a conventional video signal recorder, such as VTR 1, can be used to record and reproduce audio signals with high fidelity, without requiring any structural change or modification in the recorder itself.

Record/Playback Control

Referring now to FIG. 3, a portion of the overall system shown in FIG. 1 is illustrated in greater detail. The illustrated circuitry is used to control memory device 8 (16) for pulse recording and reproducing operations by VTR 1, the memory device here being identified by reference numeral 31 from which pulse data is supplied to VTR 1 through mixer 9 and to which pulse data is supplied by the VTR through a pre-amplifier 30. Also illustrated is a parallel-serial/serial-parallel converter 37 which is a practical embodiment of parallel-to-serial converter 7 capable of serializing pulse data during a recording operation, and also of serial-to-parallel converter 17 for converting a serial pulse train into parallel form during a reproducing operation. Thus, pulse encoded audio information produced by A/D converters 6R and 6L is serialized by converter 37 and then supplied to memory 31 wherein its time axis is compressed before being supplied through mixer 9 to VTR 1 for recording. During signal playback, the pulse data reproduced by VTR 1 is supplied through preamplifier 30 to memory 31, wherein the time axis thereof is expanded, and then reconverted to parallel form by converter 37 before being transformed into an analog audio signal by D/A converters 18L and 18R. This data signal path is represented by the double lines shown in FIG. 3.

Control over memory 31 and the data signal path is achieved by appropriate control signals transmitted along control signal paths represented by the single line in FIG. 3. Although single lines are shown, in some instances, a single line represents plural conductors. The control circuitry is formed of reference oscillator 11, synchronizing signal generator 33, clock pulse generator 34, START/STOP signal generator 35, synchronizing signal separator 36, sync signal control circuit 36', mode signal generator 47 and memory control circuit 32. Also shown are various record/playback selector switches 41 through 45, adapted to be ganged for simultaneous operation, preferably automatically, between a record (REC) condition and a playback (PLB) condition, and a record selecting push-button switch 46. Reference oscillator 11 is adapted to produce reference clock pulses of a relatively high frequency, these clock pulses being supplied to synchronizing signal generator 33 and through switch 44 in its REC condition to clock pulse generator 34. The synchronizing signal generator functions to generate synchronizing pulses $H_D$ (FIGS. 2A–2C) and also the various pulses shown during the vertical blanking interval (FIGS. 2A and 2C), hereinafter designated the vertical sync signal $V_D$. Pulses $H_D$ and signals $V_D$ may be interpreted to be simulated horizontal and vertical synchronizing signals. Synchronizing signal generator may be comprised of conventional counting and gating circuits arranged in circuit to generate pulses $H_D$ and vertical sync signal $V_D$.

Clock pulse generator 34 is formed of frequency-dividing, timing and gating circuitry and is adapted to produce various timing signals which are supplied to converter 37 and to memory control circuit 32. When switch 44 is in its REC condition, clock pulse generator 34 responds to the reference clock pulses generated by reference oscillator 11 to produce the timing signals by which converter 37 converts parallel pulses to serial pulses and to produce memory timing pulses which are used by memory control circuit 32 to control the writing-in and reading-out of data with respect to memory 31. When switch 44 is in its PLB condition, clock pulse generator 34 is responsive to synchronizing signals $H_D$, which are reproduced by VTR 1 from previously recorded magnetic tape, for producing the timing pulses. Hence, during a reproducing operation, memory 31 and converter 37 are synchronized with any time-base error that may be present, thereby to correct for jitter or other signal distortion caused by, for example, tape fluctuation, tape shrinkage, stretching, etc.

Vertical sync signal $V_D$ and synchronizing signal $H_D$ produced by synchronizing signal generator 33 are supplied to sync signal control circuit 36' by switch 43 when the latter is in its REC condition. These signals also are supplied to mixer 9 for combining with the pulse data read out of memory 31 so as to form the composite signal shown in FIG. 2A for recording. Sync signal control circuit 36' is adapted to selectively delay the vertical sync signal $V_D$ so as to selectively extend the duration of the vertical blanking interval by one-half of a line interval during each odd field. That is, the sync signal control circuit selectively determines whether data pulses will follow the vertical synchronizing pulses by one line interval (or three synchronizing pulses $H_D$) or by 1.5 line intervals, as shown in FIG. 2C. Sync control circuit 36' may comprise a selectively energized, or gated, delay circuit, such as a monostable multivibrator. The delayed, or extended, vertical sync signal is designated $V'_D$, and this, together with the non-delayed vertical sync signal $V_D$ and synchronizing pulses $H_D$ generated by synchronizing signal generator 33 are supplied to START/STOP signal generator 35 when switch 43 is in its REC condition.

The START/STOP signal generator is adapted to produce gating signals, for example, START signals, at appropriate times and of suitable duration in response to synchronizing pulses $H_D$ and vertical sync signal $V_D$ such that pulse data can be written into and read out of memory 31. During a recording operation, the START signal produced by START/STOP signal generator 35 for reading pulse data out of memory 31 is of a duration corresponding to the time needed to transmit 735 words to VTR 1 between vertical blanking intervals; and, similarly, during a reproducing operation, the START signal for writing pulse data into memory 31 from VTR 1 also corresponds to this duration. The START signal produced by the START/STOP signal generator for writing pulse data into memory 31 during recording and for reading pulse data out of this memory during reproducing is substantially continuous, except that the recording write pulse START signal commences at the start of the next field interval following initiation of the recording operation, and the reproducing read pulse START signal is delayed by an amount sufficient to permit some number of words to be written into the memory following initiation of the reproducing operation. When a START signal is not produced by START/STOP signal generator 35, a STOP signal is produced to inhibit data from being written into and read out of memory 31. Accordingly, the START/STOP signal generator is comprised of pulse counting, gating and delay circuitry which is responsive to the synchronizing pulses $H_D$ and vertical sync signal $V_D$, as well as to record control signal REC and reproducing (or playback) control signal PLB which are supplied thereto by mode signal generator 47, to be described. The START and STOP signals are supplied to memory control circuit 32 and to converter 37 for selectively enabling or inhibiting the operation of these cicuits.

Memory control circuit 32 is described in greater detail below with respect to FIGS. 4 and 5. If it is assumed that memory 31 is addressable, such as a RAM, then the memory control circuit includes addressing circuits for generating write-in and read-out addresses for the memory so that pulse data can be written into and read out of memory 31, respectively, thereby changing the time-axis thereof (time-domain compression and expansion). As will soon become apparent the write-in and read-out operations are performed substantially independently of each other, but at different rates. To avoid the possibility of an erroneous write-in or read-out operation which could occur in the event that these operations are performed at the same instant of time, memory control circuit 32 includes priority determining circuitry to award priority to one operation while delaying the performance of the other. The memory control circuit is shown coupled to memory 31 to supply the suitable addresses and read/write control pulses to the memory so that pulse data can be stored and withdrawn therefrom. As will be further described in connection with FIG. 4, memory 31 may include input and output circuitry through which the pulse data is written in and read out.

Synchronizing signal separator circuit 36 is coupled to preamplifier 30 and is adapted to detect the synchronizing pulses $H_D$ and vertical sync signal $V_D$ that are included in the pulse signals reproduced by VTR 1. The synchronizing signal separating circuit may be of a type conventionally used in video (e.g. television) signal applications, such as formed of gating and timing circuits. Synchronizing pulses $H_D$ are supplied by synchronizing signal separator circuit 36 to clock pulse generator 34 via switch 44 in its PLB condition so that the clock pulse generator can provide suitable timing pulses to converter 37 for a serial-to-parallel data conversion, and suitable timing pulses to memory control circuit 32 for storing pulses and withdrawing pulses from memory 31, during a reproducing operation. Also, when switch 43 is in its PLB condition, the synchronizing pulses $H_D$ and vertical sync signal $V_D$ recovered by synchronizing signal separator circuit 36 are supplied to START/STOP signal generator 35 in place of the synchronizing pulses and vertical sync signal that are produced by synchronizing signal generator 33, described above.

Vertical sync signal $V_D$ produced by synchronizing signal separator circuit 36 also is applied to mode signal generator 47. The mode signal generator is responsive to the operation of record selecting pushbutton switch 46 to generate a record enable control signal REC or a playback enable control signal PLB, as aforesaid, and also to generate a standby signal STBY immediately following the actuation of switch 46 but prior to the occurrence of the REC and PLB signals, respectively. The PLB and STBY signals are synchronized with vertical sync signals $V_D$ produced by synchronizing signal separator circuit 36 so that memory control circuit 32, START/STOP signal generator 35 and converter 37, which are supplied with selected ones of the PLB and STBY signals, are correspondingly synchronized with the signals reproduced by VTR 1. Standby signal STBY serves to reset memory control circuit 32 and converter 37 to an initial, or reference, condition so as to avoid an improper write-in or read-out operation of memory 31. Playback control signal PLB is produced when switch 46 is open and record control signal REC is produced when this switch is closed. Of course, if desired, the manner in which PLB and REC signals are produced can be reversed.

The operation of the illustrated apparatus can be readily ascertained from the foregoing description; hence, such operation now will be described only briefly. Let it be assumed that a recording operation is selected so that switches 41 through 45 are in their respective REC conditions, and record selecting pushbutton switch 46 is closed. Hence, the reference clock pulses produced by reference oscillator 11 are utilized by clock pulse generator 34 to produce the timing pulses which control memory control circuit 32 and converter 37. The reference clock pulses also are utilized by synchronizing signal generator 33 to generate synchronizing pulses $H_D$ and the vertical sync signal $V_D$.

When switch 46 is closed, standby signal STBY first is produced by mode signal generator 47 to reset converter 37 and memory control circuit 32 to their respective initial conditions. Then, mode signal generator 47 produces record control signal REC which actuates START/STOP signal generator 35 to respond to synchronizing pulses $H_D$ and vertical sync signal $V_D$ to produce the START signal which enables pulse data to be written into and read out of memory 31. Thus, a parallel-bit word supplied to converter 37 by the A/D converters (FIG. 1) is serialized, supplied through switch 41 and written into addressed locations in memory 31 at a first, slower rate. The stored pulses subsequently are read out of their storage locations at a second, faster rate; and transmitted through switch 42 and mixer 9 to VTR 1 for recording. Synchronizing pulses $H_D$ are supplied to mixer 9 by synchronizing signal generator 33 for insertion between successive words; and the vertical sync signal produced by the synchronizing signal generator is inserted between adjacent fields. Depending upon the time of occurrence of the read START signal produced by START/STOP signal generator 35, which is a function of the delay imparted to the vertical sync signal $V_D$ by sync signal control circuit 36', pulse data will be read out of memory 31 either 1.0 or 1.5 line intervals following the vertical synchronizing pulses in the odd or even fields, respectively. Thus, pulse encoded audio signals of the type shown in FIGS. 2A–2C are recorded.

When a reproducing operation is selected, switches 41 through 45 are in their respective PLB conditions and record selecting pushbutton switch 46 is opened. Hence, the reference clock pulses produced by reference oscillator 11 no longer are supplied to clock pulse generator 34, nor are the synchronizing pulses $H_D$ are vertical sync signal $V_D$ produced by synchronizing signal generator supplied to START/STOP signal generator 35. The opening of switch 46 actuates mode signal generator 47 to produce the standby signal STBY in synchronism with the vertical sync signal $V_D$ which had been recorded and which is separated from the reproduced signal by synchronizing signal separator circuit 36. Thus, memory control circuit 32 and converter 37 are reset to their initial condition by this STBY signal. When the playback control signal PLB is produced by the mode signal generator, START/-STOP signal generator 35 responds to the synchronizing pulses $H_D$ and vertical sync signal $V_D$ separated from the signals reproduced by VTR 1 and supplied thereto from synchronizing signal separator 36 via switch 43 to produce the START signal which enables pulse data to be written into and read out of memory 31. Also, the separated synchronizing pulses $H_D$ are supplied through switch 44 to clock pulse generator 34, whereby the clock pulse generator produces the timing pulses which control converter 37 and memory control circuit 32. Since these timing pulses are synchronized with the synchronizing pulses $H_D$ reproduced by VTR 1, the memory write-in operation performed by the memory control circuit will substantially correct for time-base errors in the reproduced signals. Accordingly, serialized pulse data reproduced by VTR 1 is supplied to memory 31 via preamplifier 30 and switch 41 and is written into addressed locations therein at the faster rate previously used to read-out and record the pulse data. The pulses now stored in memory 31 are read-out from their storage locations and serially transmitted through switch 42 to converter 37 at the slower rate previously used to write-in pulse data for recording. Since memory control circuit 32 is synchronized with recovered synchronizing pulses $H_D$ and is controlled by the START signal (which is synchronized with recovered vertical sync signal $V_D$), only the pulse encoded audio information reproduced by VTR 1 is stored in memory 31. This serialized pulse data is converted to a parallel-bit word by converter 37 which, in turn, is transformed into an analog audio signal by D/A converter 18L and 18R.

Memory and Memory Control

Figure 4A:
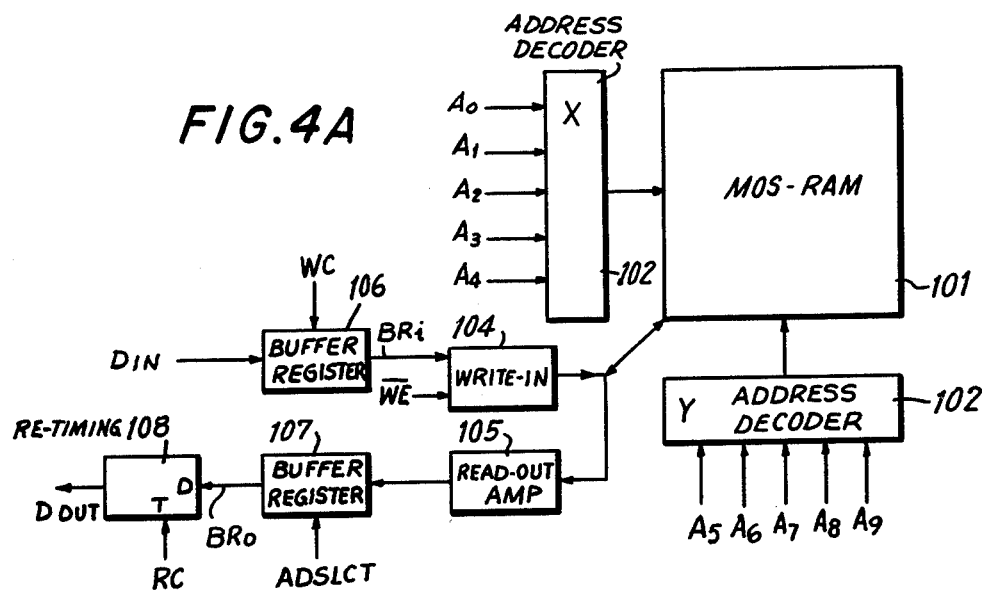
FIGS. 4A and 4B are block diagrams of the memory and memory control apparatus shown in FIG. 3.
Figure 4B:
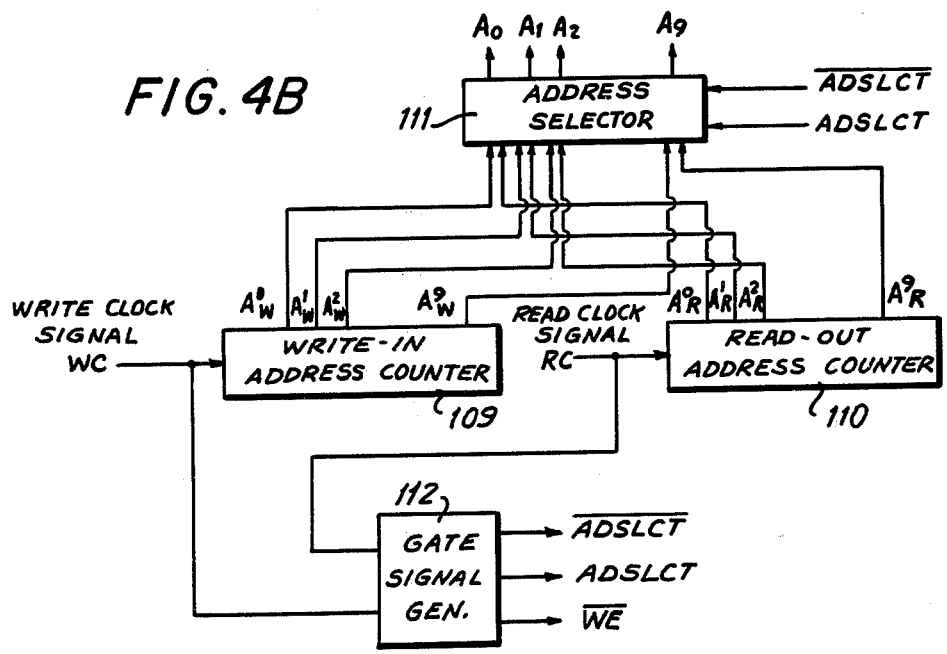

FIGS. 4A and 4B are block diagram showing memory 31 and memory control circuit 32 (FIG. 3) in greater detail. With reference to FIG. 4A, the memory is illustrated as RAM 101, preferably formed of MOS devices, and having addressable X and Y coordinate locations. That is, a memory location whereat a data bit included in a pulse coded data word is stored is determined by an X coordinate and a Y coordinate. The number of addressable memory locations provided in RAM 101 is equal to its capacity $C_M$ which is equal to the capacity $C_A$ for compressing the time axis of the pulse data during a recording operation (or expanding the time axis during a reproducing operation) plus the capacity $C_B$ for correcting the time-base error that may be present in the reproduced data pulses. That is, $C_M = C_A + C_B$. For time compression, a number of data words first are stored in RAM 101 and then, as other data words are written in, the previously stored words are read out at a faster rate. The delay in reading out these words is equal to $C_A/f_s$, where $f_s$ is the sampling rate, and is determined such that the memory read-out operation for one field of pulse data terminates simultaneously with the write-in operation. Thus, in the waveforms of FIGS. 2A-2C, just after data word #735 is written into RAM 101, it is read out therefrom. The time required to read-out all of the 735 words from RAM 101 is $735/f_t$, while the time required to write all of these words into the RAM is $735/f_s$. Thus, $C_A/f_s + 735/f_t = 735/f_s$. From the numerical parameters and relationships described previously, $C_A = 49$ words = 1274 bits.

In a reproducing operation, pulses are written into RAM 101 at a faster rate ($f_t$) than the rate ($f_s$) at which they are read out. If there is no time-base error, pulse read-out is initiated simultaneously with pulse write-in. However, if there is a time-base error, this can be corrected by delaying the read-out operation by $C_B/2f_t$. The capacity for time-base correction is selected to be $C_B = 12$ words. This means that time-base error or jitter, of greater than 0.2 Hz will be corrected. Therefore, the total capacity $C_M$ of RAM 101 is $C_M = C_A + C_B = 61$ words = 1586 bits. Hence, RAM 101 is provided with at least 1586 storage locations. A conventional random access memory that can be used for RAM 101 is a 64 × 64 X-Y addressable array.

RAM 101 is provided with X address leads coupled to an X-address decoder 102 and with Y address leads coupled to a Y-address decoder 103. These decoders are conventional and are adapted to select the proper X and Y addresses of RAM 101 in response to a digital address supplied to each. Although the decoders each are shown to receive a 5-bit address, it is appreciated that 64 addressable X locations are selected by a 6-bit address code, and 64 addressable Y locations also are selected by a 6-bit code. However, for simplification, it is assumed that X-address decoder 102 is provided with address bits $A_0 \ldots {}_4$ and that Y-address decoder 103 is provided with address bits $A_5 \ldots A_9$. These address bits are generated by the addressing circuitry shown in FIG. 4B and are used to select write-in and read-out addresses, as will be described.

RAM 101 also is provided with a pulse input terminal coupled to a data write-in channel including a buffer register 106 and write-in gates 104. In addition, RAM 101 includes a pulse output terminal coupled to a read-out channel formed of a read-out amplifier 105, a buffer register 107 and a reclocking, or resynchronizing, circuit 108. For simplification, the pulse input and output terminals of RAM 101 are shown to be a single terminal; however, this need not be the actual construction thereof. Buffer register 106 of the write-in channel is, for example, a two or three bit shift register having an input terminal adapted to receive pulse data $D_{IN}$ supplied by parallel-to-serial converter 37 (FIG. 3) during a recording operation or by preamplifier 30 during a reproducing operation. Buffer register 106 also includes a write clock pulse WC produced by clock pulse generator 34, this pulse being derived during recording from the reference clock pulses produced by reference oscillator 11 and during reproducing from the recovered synchronizing pulses $H_D$. The buffer register thus retimes input pulse data $D_{IN}$ with write clock pulses WC to form resynchronized pulse data $BR_i$ which is supplied to write gates 104. A gating signal $\overline{WE}$ also is supplied to write gates 104 and is adapted to enable the write gate to write a data pulse into an addressed location of RAM 101. Gating signal $\overline{WE}$ is produced by a block shown in FIG. 4B and described in greater detail with respect to FIG. 7. In this example, it will be assumed that a data pulse $BR_i$ is written into RAM 101 when gating signal $\overline{WE}$ is relatively negative, or of a low amplitude, corresponding to a binary 0.

Figure 7:
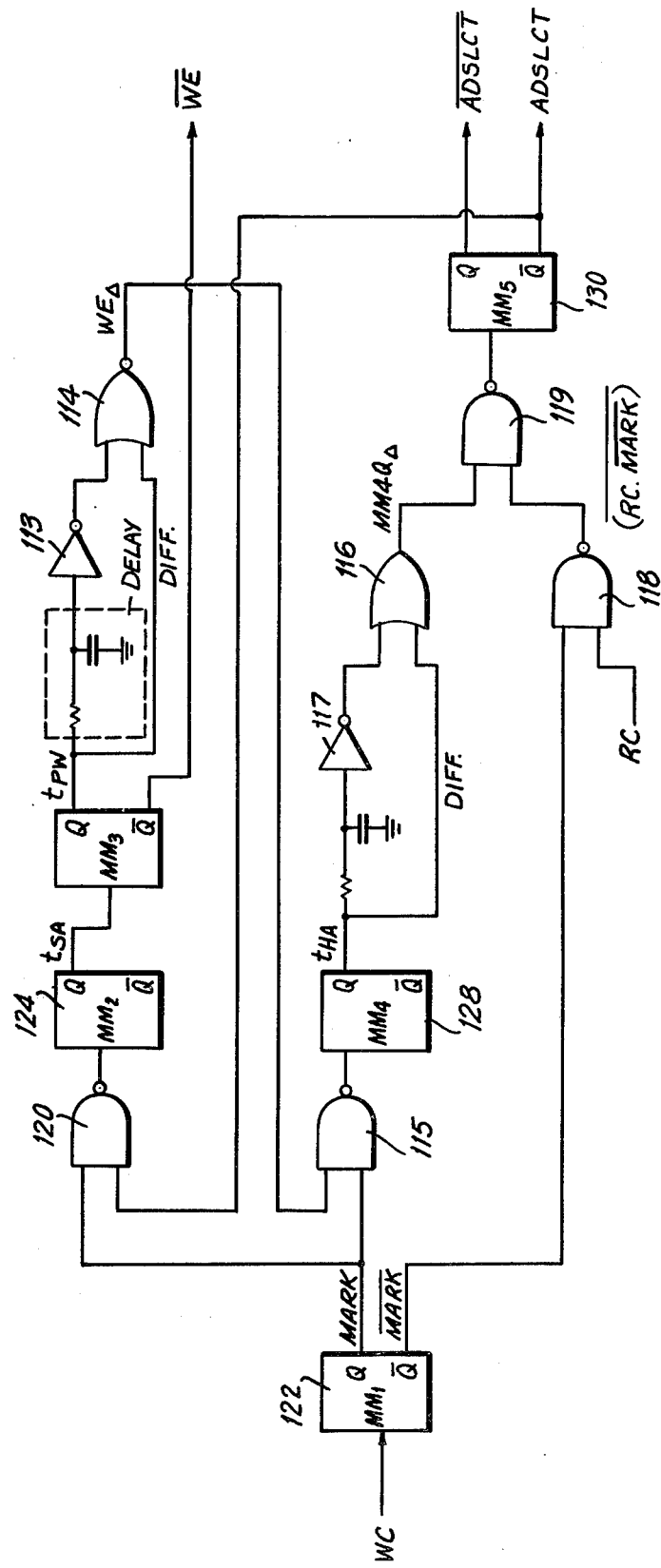
FIG. 7 is a logic circuit diagram of one of the control circuit blocks shown in FIG. 4.

In the read-out channel pulse data supplied to read-out amplifier 105 from the RAM pulse output terminal is supplied to buffer register 107. A gating signal ADSLCT also is supplied to this buffer register and is adapted to enable it to transmit the data pulse that then is received from RAM 101. Hence, buffer register 107 may be formed of a gating circuit adapted to supply read out pulse data $BR_o$. The timing of these read out pulses $BR_o$ is dependent upon that of gating signal ADSLCT and, as will be mentioned in connection with FIG. 4B and described in greater detail with respect to FIG. 7, is asynchronous. In order to re-time, or resynchronize, pulses $BR_o$, they are supplied to reclocking circuit 108, which may be a timing-pulse controlled flip-flop circuit, such as a D-type flip-flop having a data terminal D supplied with pulse data $BR_o$ and a timing pulse terminal T supplied with read clock pulses RC. These read clock pulses are produced by clock pulse generator 34 and are derived during both recording and reproducing from the reference clock pulses produced by reference oscillator 11 (although this is not clearly shown in FIG. 3). Reclocking circuit 108 supplies the resynchronized pulse data $D_{OUT}$ to VTR 1 during a recording operation and to serial-to-parallel converter 37 during a reproducing operation.

Although not shown in detal, RAM 101 is adapted to have data written into or read out of an addressed location so long as that address is present for a predetermined minimum time duration, this duration being a function of the particular memory device which is used. As will now be described with reference to FIG. 4B, a read-out address is present when gating signal ADSLCT is relatively positive, or high, corresponding to a binary 1, and a write-in address is present when complementary gating signal $\overline{ADSLCT}$ is a binary 1 (ADSLCT is a binary 0). These gating signals ADSLCT and $\overline{ADSLCT}$, as well as gating signal $\overline{WE}$, are produced by a gate signal generator 112, which is shown in greater detail in FIG. 7, in response to write clock pulse WC and read clock pulse RC. As will be explained, gate signal generator 112 also produces a periodic signal MARK in response to each write clock pulse WC applied thereto. The MARK signal functions to detect whether a memory read-out operation is in progress at the time of occurrence of a memory write-in operation and, if so, delays initiation of the write-in operation. The MARK signal also functions to control the ADSLCT gating signal which is used to initiate a read-out operation, and thus serves to delay the read-out operation in the event that a write-in operation is in progress.

In FIG. 4B, write clock pulses WC are applied to a write-in address counter 109 and read clock pulses RC are applied to a read-out address counter 110, respectively. These counters are similar and may be conventional binary or other digital counters capable of counting the clock pulses applied thereto so as to produce a binary or digital count representing the number of counted pulses. Hence, address counter 109 produces a coded count $A_{1W} \ldots A_{9W}$ representing a write-in address location for RAM 101, while address counter 110 produces a coded count $A_{1R} \ldots A_{9R}$ representing a read-out address location for RAM 101. These addresses are dependent upon the write and read clock pulses, and thus are independent of each other. The write-in address count $A_{1W} \ldots A_{9W}$ and the read-out address count $A_{1R} \ldots A_{9R}$ are supplied to an address selector 111 which may comprise a gating circuit responsive to complementary gating signals ADSLCT and $\overline{ADSLCT}$ to provide one or the other address count at its output terminals. That is, when gating signal ADSLCT is a binary 1, address selector 111 gates the write-in address count $A_{1W} \ldots A_{9W}$ to its output terminals; whereas when gating signal $\overline{ADSLCT}$ is a binary 1 (ADSLCT is a binary 0), address selector 111 gates the read-out address count $A_{1R} \ldots A_{9R}$ to its output terminals. These address counts are applied to X and Y address decoders 102 and 103, as described previously, to select corresponding write-in and read-out address for RAM 101.

Recording Operation

The operation of the illustrated apparatus now will be described for a recording operation. Referring to FIGS. 5A–5J, let it be assumed that serialized pulse data is supplied as $D_{IN}$ to buffer register 106, and these pulses are resynchronized with the write clock pulses WC (FIG. 5B) to form the data bits $BR_i$ (FIG. 5A). In one field formed of, for example, 735 words of 26-bits each, FIG. 5A represents that bits 109, 110, . . . 112 are being received. As shown in FIG. 4B, the write-in address count produced by counter 109 is determined by the write clock pulses WC of FIG. 5B. Hence, the write-in address count changes in the manner illustrated by FIG. 5C; so that when bit #109 is present, the address for that bit is produced, when bit #110 is present, the address for bit #110 is produced, and so on.

As wil be explained below in conjunction with FIG. 7, the MARK signal (FIG. 5D) is produced by write clock pulses WC, for example, by triggering a one-shot multivibrator with the write clock pulses. Accordingly, the duration of each MARK pulse (binary 1) is relatively constant. The MARK signal is combined with write clock pulses WC and read clock pulses RC in gate signal generator 112 to produce the ADSLCT gating signal shown in FIG. 5H. The manner in which this gating signal is produced will be described in detail below. For the present discussion, it merely is stated that complementary gating signal $\overline{ADSLCT}$ is produced by a retriggerable one-shot multivibrator by the read clock pulses RC (FIG. 5E) when the MARK signal is a binary 0, or by the positive transition in the gating signal $\overline{WE}$ when the MARK signal is a binary 1. Thus, the duration of the $\overline{ADSLCT}$ pulse (binary 1) is a function of the one-shot multivibrator time constant, this duration being represented as $t_{RC}$ of the ADSLCT signal shown in FIG. 5H.

As can be seen from a comparison between the write clock pulses WC in FIG. 5B and the read clock pulses RC in FIG. 5E, during a recording operation the write clock pulse rate is less than the read clock pulse rate. Accordingly, the write interval $T_W$ defined by the write clock pulses and during which a data bit is written into RAM 101 is greater than the read interval $T_R$ defined by the read clock pulses, this read interval establishing the time during which a data bit is read from RAM 101. The actual time required for writing in or reading out data bits, i.e., the write or read cycle, is substantially less than the write or read intervals $T_W$ or $T_R$, respectively. Hence, the positive transition in the ADSLCT gating signal may be delayed until some later time during the read interval $T_R$ in the event that a write cycle is being performed; and similarly, the initiation of a write cycle may be delayed until some later time during the write interval $T_W$ in the event that a read cycle is being performed. Nevertheless, a write cycle and a read cycle will be performed during successive write and read intervals, even though these intervals overlap.

The gating signal $\overline{WE}$ (FIG. 5G) is produced when the MARK signal and the ADSLCT gating signal both are a binary 1 (that is, both are relatively positive or high), but at a time delayed therefrom, as will be explained below with respect to FIG. 7. The gating signal $\overline{WE}$ is produced by a one-shot multivibrator, and thus, the duration that $\overline{WE}$ is a binary 0 is fixed by the multivibrator time constant. Since the time of occurrence of the ADSLCT gating signal as a binary 1 is variable relative to the time of occurrence of the MARK signal as a binary 1, the time of occurrence of a gating signal $\overline{WE}$ can occur only when the interval $t_{wc}$, during which the ADSLCT signal is a binary 1, exceeds a predetermined minimum. This minimum duration is the time necessary to "set up" the write-in address ($t_{SA}$), the time during which a data bit is written into RAM 101 ($t_{PW}$), and the "hold time" for the address ($t_{HA}$), all of which being a function of the particular memory device which is used.

As shown in FIG. 4B, the read-out address count produced by counter 110 is determined by the read clock pulses RC of FIG. 5E. Hence, the read-out address count changes in the manner illustrated by FIG. 5F, when successive addresses are produced during successive read-out intervals $T_R$ for reading out the data bits stored at, for example, addresses #6, 7, . . . , and so on.

Now, as shown in FIGS. 5B, 5D, 5E and 5H, the first write clock pulse WC, at time $t_1$, precedes the first read clock pulse RC at time $t_2$. Hence, the MARK signal is a binary 1 when read clock pulse $RC_1$ is produced, thereby inhibiting a read cycle but enabling a write cycle, as illustrated by ADSLCT gating signal which is a binary 1. Accordingly, gating signal $\overline{WE}$ is a binary 0 to enable write gates 104 to write bit #109 into address #109 in RAM 101. When this gating signal $\overline{WE}$ returns to a binary 1, the ADSLCT gating signal is triggered to a binary 0 at time $t_3$ so as to establish a read time duration $t_{RC}$ during which bit #7 stored in address #7 can be read out. This read time duration, although occurring during the read interval $T_R$, is delayed from the time that read clock pulse $RC_1$ occurs so as to avoid interference with the write cycle then in progress.

At the conclusion of the read time duration $t_{RC}$ (which is determined by the multivibrator time constant) at time $t_4$, the ADSLCT gating signal undergoes a positive transition to gate bit #7 out of RAM 101 from address #7 into buffer register 107. Then the next read clock pulse $RC_2$ occurs at time $t_5$ which precedes the next write clock pulse $WC_2$ at time $t_6$. Read clock pulse $RC_2$ triggers the ADSLCT gating signal to a binary 0, and also resynchronizes read-out bit #7 ($BR_o$) in retiming circuit 108, as shown in FIG. 5J. Although the ADSLCT signal is a binary 1 from time $t_4$ to time $t_5$, the MARK signal is a binary 0, thereby inhibiting another write-in cycle at this time.

At the time $t_6$ that write clock pulse $WC_2$ occurs, the ADSLCT signal is a binary 0. Hence, even though the MARK signal is triggered to a binary 1 by write clock pulse $WC_2$, a write cycle cannot be initiated until the ADSLCT signal returns to a binary 1. However, another read cycle can be performed during this read time duration $t_{RC}$. As shown in FIG. 5G, during this time, address #8 of RAM 101 is selected by read-out address counter 110, address selector 111 and X and Y address decoders 102 and 103. Accordingly, when the ADSLCT gating signal returns to a binary 1 at time $t_7$, bit #8 is read out of RAM 101 into buffer register 107 (FIG. 5I). At this same time, both the MARK and ADSLCT signals are binary 1, thereby triggering the $\overline{WE}$ gating signal to a binary 0, as illustrated in FIG. 5G. Thus, bit #110 which is supplied to write-in gates 104 is written into address #110 in RAM 101.

As seen from the foregoing, depending upon the relative times of occurrence of write clock pulses WC and read clock pulses RC, one or the other of a write or a read operation will be delayed. In the example described above, a write operation first is performed, then a read operation, another read operation and a write operation. Nevertheless, each operation was performed during its respective write or read interval $T_W$ or $T_R$; and only one write operation was performed during one write interval while only one read operation was performed during one read interval. The remaining bits 111 and 112 are written into RAM 101 while the remaining bits 9, 10 and 11 are read out therefrom in the manner described above. It may be appreciated that first bit #9 is read out, then bit #111 is written in, then bit #10 is read out, then bit #112 is written in, then bit #11 is read out. Each bit that is read out from RAM 101 is retimed to the read clock pulse rate and recorded by VTR 1.

Reproducing Operation

The various waveforms which are produced during a reproducing operation are shown in FIGS. 6A–6J. These waveforms are similar to those just discussed with reference to FIGS. 5A–5J, except that now the write clock pulse rate (corresponding to the VTR playback rate) is greater than the read clock pulse rate so that $T_W < T_R$. Nevertheless, the conditions for producing the MARK signal, ADSLCT gating signal and $\overline{WE}$ gating signal are the same as described above.

At the first illustrated write clock pulse WC, occurring at time $t_1$, the MARK signal is triggered to a binary 1 for a fixed time period during which a write operation is enabled and a read operation is inhibited. At this time the gating signal ADSLCT is a binary 1, so gating signal $\overline{WE}$ is triggered to a binary 0. Consequently, write gates 104 are enabled to write bit #109 (supplied by VTR 1) into address #109 in RAM 101.

The first illustrated read clock pulse RC, occurs at time $t_2$. Since the MARK signal is a binary 1 at this time, a read operation is inhibited at least until time $t_3$ when the MARK signal returns to a binary 0. At that time, that is, at time $t_3$, the ADSLCT gating signal is triggered to a binary 0 by the return of the $\overline{WE}$ gating signal to a binary 1. The ADSLCT signal thus establishes the read time duration $t_{RC}$ during which RAM address location #7 is being addressed. FIG. 6H shows that this read time duration is delayed from time $t_2$, the time at which read clock pulse $RC_1$ occurs, so as to avoid interference with the write operation in progress from time $t_1$ to time $t_3$.

The read time duration $t_{RD}$ (which is determined by the time constant of the one-shot multivibrator) ends at time $t_4$, whereupon the ADSLCT gating signal undergoes a positive transition to gate bit #7 out of RAM 101 from address #7 into buffer register 107. It is recalled that this bit will be resynchronized with the next read clock pulse $RC_2$ in retiming circuit 108, as shown in FIG. 6J. The retimed data bits $D_{OUT}$ are supplied serially to serial-to-parallel converter 37 for conversion into parallel form, and then are converted to audio analog signals by D/A converters 18L and 18R. However, at about time $t_4$, that is, after bit #7 is read out of RAM 101 but before this bit is resynchronized, the next write clock pulse $WC_2$ occurs. Accordingly, MARK signal is triggered to a binary 1 which coincides with the binary 1 of ADSLCT signal to trigger gating signal $\overline{WE}$ to a binary 0 again. Therefore, the next data bit #110 is written into address #110 of RAM 101.

The MARK signal returns to a binary 0 at time $t_5$. Since the gating signal $\overline{WE}$ had returned to a binary 1, the ADSLCT gating signal is triggered to a binary 0 to enable another read operation. Then, at time $t_6$ when the next read clock pulse $RC_2$ occurs, the retriggerable one-shot multivibrator which establishes the read time duration $t_{RC}$ is retriggered by this read clock pulse to extend the read time duration, as shown in FIG. 6H. At time $t_7$ the read time duration (extended) terminates and the ADSLCT signal returns to a binary 1 to gate bit #8 out of RAM 101 into buffer register 107. It is appreciated that bit #8 is not resynchronized until the occurrence of read clock pulse $RC_3$.

When the next write clock pulse $WC_3$ occurs, the MARK signal is triggered to a binary 1, which coincides with the binary 1 of the ADSLCT gating signal so as to generate gating signal $\overline{WE}$ to gate bit 111 into RAM 101. Then, gating signal $\overline{WE}$ returns to a binary 1 which triggers the ADSLCT signal to a binary 0. Before the ADSLCT signal can return to a binary 1 (a function of the multivibrator time constant), the next read clock pulse $RC_3$ occurs so as to extend the read time duration $t_{RC}$. During this extended time duration, the next write clock pulse $WC_4$ occurs. However, a write operation is inhibited because the ADSLCT signal is a binary 0. Once the ADSLCT signal returns to a binary 1, bit #9 is read out of RAM 101 and the $\overline{WE}$ gating signal is triggered to a binary 0 (because the MARK signal is a binary 1 at this time). Then, bit #112 is written into RAM 101.

As illustrated in FIGS. 6B, 6D, 6E, 6G and 6H, the next write clock pulse signal $WC_5$ precedes the next read clock pulse signal $RC_4$. Hence, after bit #112 is writen into RAM 101, bit #113 is written in prior to reading out bit #10. Therefore, a reproducing operation is similar to a recording operation in that only one write operation is performed during a write interval $T_W$ and only one read operation is performed during a read interval $T_R$, but one or the other of these operations will be delayed if a write (or read) clock pulse occurs while a read (or write) operation is in progress.

Gate Signal Generator

Gate signal generator 112, which is adapted to produce gating signals $\overline{WE}$, ADSLCT and $\overline{ADSLCT}$, is shown in greater detail in FIG. 7 as comprising monostable (or one-shot) multivibrators 122, 124, 126, 128 and 130 (also designated MM1, MM2, MM3, MM4 and MM5, respectively), gates 115, 118, 119 and 120, and two differentiating circuits. This circuitry is supplied with write clock pulses WC and read clock pulses RC produced by clock pulse generator 34 (FIG. 3). For convenience, and in the interest of simplification, it is assumed that the monostable multivibrators are of similar construction to be triggered from a stable condition to an unstable condition in response to a negative (for multivibrators 124 and 126) or positive (for multivibrators 122, 128 and 130) transition in the input signal applied thereto. Each multivibrator is provided with complementary outputs Q and $\overline{Q}$, with a stable condition represented by a binary 0 at the Q output (a binary 1 at output $\overline{Q}$) and an unstable condition represented by a binary 1 at output Q (a binary 0 at output $\overline{Q}$). When triggered to its unstable condition the multivibrator produces a binary 1 at its Q output for a time duration determined by the time constant of that multivibrator.

The input of monostable multivibrator 122 is adapted to receive write clock pulse WC, and its Q output is coupled through gate 120 to monostable multivibrator 124 and also through gate 115 to monostable multivibrator 128. Each of these gate circuits is a NAND gate capable of producing an output signal which is a binary 0 only when all of the input signals applied to the NAND gate are binary 1's. When any such input signal is a binary 0, the NAND gate produces a binary 1 output signal.

The Q output of monostable multivibrator 124 is coupled to monostable multivibrator 126 to trigger the latter when multivibrator 124 returns to its stable condition. The $\overline{Q}$ output of multivibrator 126 produces the $\overline{WE}$ gating signal. Thus, as is appreciated, the Q output of this multivibrator produces a WE signal. The negative transition, or trailing edge, of signal WE is adapted to be differentiated. Although any suitable differentiating circuitry capable of producing a positive pulse at the trailing edge of signal WE can be used, the illustrated differentiating circuit includes an RC delay circuit coupled to the Q output of multivibrator 126, an inverter 113 coupled to the R-C delay circuit, and a NOR gate 114 having one input coupled to the output of inverter 113 and another input coupled to the Q output of multivibrator 126. Inverter 113 is adapted to invert the logical sense of the delayed WE signal, that is, to produce a binary 0 in response to a binary 1 and to produce a binary 1 in response to a binary 0. NOR gate 114 functions to produce a binary 0 when any of its inputs is supplied with a binary 1 and to produce a binary 1 only when all of its inputs receive binary 0's. The differentiated output signal WEΔ provided at the output of NOR gate 114 is supplied through another input of NAND gate 115 to the input of multivibrator 128.

The Q output of monostable multivibrator 128 is coupled to a differentiating circuit formed of a time delay circuit, an inverter 117 and one input of an OR gate 116 connected in series to the Q output of the multivibrator, with the other input of OR gate 116 connected directly to the Q output. This differentiating circuit functions to produce a negative pulse at the negative transition, or trailing edge, of the signal produced by multivibrator 128. This differentiated output signal MM4QΔ is supplied through NAND gate 119 to trigger monostable multivibrator 130 to its unstable state represented by a binary 1 at the Q output thereof ($\overline{ADSLCT}$ signal is a binary 1) and a binary 0 at the $\overline{Q}$ output (ADSLCT signal is a binary 0). The other input of NAND gate 119 is coupled to the output of NAND gate 118 which has one input thereof coupled to the $\overline{Q}$ output of multivibrator 122 so as to receive the $\overline{MARK}$ signal and the other input thereof coupled to receive the read clock pulses RC. The $\overline{Q}$ output of multivibrator 130 is connected to the other input of NAND gate 120.

Recording Operation

The operation of the gate signal generator of FIG. 7 will best be understood by referring to the waveform diagrams shown in FIGS. 8A–8O. It is recalled that in a recording operation, the repetition rate of the write clock pulses WC is less than that of the read clock pulses RC so as to achieve time axis compression of the pulse signals for the purpose of providing sufficient time for the insertion of synchronizing pulses $H_D$ and the vertical sync signal into each field of pulse data. The application of write clock pulses WC (FIG. 8A) to multivibrator 122 results in generating the MARK signal having the frequency of the write clock pulses, as shown in FIG. 8B. The duty cycle of the MARK signal during recording is just less than 50%.

If it is assumed that all of the monostable multivibrators initially are in their stable states, then the ADSLCT signal is a binary 1. Thus, when the MARK signal is triggered to a binary 1 by a write clock pulse WC at time $t_1$, the output of NAND gate 120 undergoes a negative transition to trigger multivibrator 124, thereby producing the signal $t_{SA}$ (FIG. 8O) which is the address "set up" interval mentioned above. At the conclusion of this interval at time $t_2$, multibivrator 126 is triggered to its unstable state WE for a duration equal to $t_{PW}$ (FIG. 8E). Consequently, the $\overline{Q}$ output of this multivibrator produces the gating signal $\overline{WE}$ shown in FIG. 8D. When multivibrator 126 returns to its stable state at time $t_3$, a binary 0 is produced by its Q output and is supplied to one input of NOR gate 114. However, because of the R-C delay circuit, a binary 1 still is applied to inverter 113, resulting in a binary 0 also supplied to the other input of the NOR gate. Accordingly, NOR gate 114 produces the differentiated pulse WEΔ (FIG. 8F) whose width is a function of the R-C delay circuit.

NAND gate 115 will supply a positive-going pulse to multivibrator 128 whenever a negative transition is present in the differentiated pulse WEΔ while the MARK signal applied thereto is a binary 1. This condition obtains when the first differentiated pulse WEΔ is produced at time $t_3$, as shown in FIG. 8G. Hence, multivibrator 128 is triggered to produce a binary 1 at its Q output for duration equal to $t_{HA}$ (a function of the multivibrator time constant) illustrated in FIG. 8H. When this multivibrator returns to its stable condition at time $t_4$, the negative transition in the MM4Q signal is differentiated to produce the negative-going pulse MM4QΔ at the output of OR gate 116 (FIG. 8I). If this pulse is produced when the output of NAND gate 118 is a binary 1, then NAND gate 119 will supply a positive transition to multivibrator 130. As shown in FIG. 8J, NAND gate 118 normally produces a binary 1 except if the read clock pulse RC occurs when the $\overline{MARK}$ signal is a binary 1 (MARK signal is a binary 0). Read clock pulses $RC_1$, $RC_5$ and $RC_6$ occur when the MARK signal is a binary 1, and thus maintain the output of NAND gate 118 at a binary 1. However, read clock pulses $RC_2$-$RC_4$ occur when the MARK signal is a binary O, thereby producing the negative-going pulses shown in FIG. 8J. Therefore, the occurrence of the first MM4QΔ pulse at time $t_4$ (FIG. 8I) is inverted by NAND gate 119 (FIG. 8K) to trigger multivibrator 130 to its unstable state. This produces the $\overline{ADSLCT}$ signal as a binary 1 (FIG. 8L) and the ADSLCT signal as a binary 0 (FIG. 8M) for a duration determined by the time constant of this multivibrator.

The ADSLCT signal and the MARK signal are gated by NAND gate 120. Accordingly, and as shown in FIG. 8N, NAND gate 120 applies a negative transition to multivibrator 124 either when the ADSLCT signal is a binary 1 and the MARK signal is triggered to a binary 1 (in response to a write clock pulse WC) as the time $t_1$, or when the MARK signal is a binary 1 and the ADSLCT signal changes to a binary 1 (when multivibrator 130 returns to its stable condition) as a time $t_8$.

The ADSLCT signal returns to a binaryy 1 at time $t_5$ when multivibrator 130 turns to its stable condition (FIG. 8M). Since the MARK signal is a binary 0 at this time, NAND gate 120 is inhibited from triggering multivibrator 124 and another $\overline{WE}$ gating is not produced.

At time $t_6$ the next read clock pulse $RC_2$ is produced. Accordingly, NAND gate 118, which is conditioned by the binary 1 applied thereto by the $\overline{MARK}$ signal, responds to the read clock pulse $RC_2$ to supply a negative-going pulse (FIG. 8J) to NAND gate 119. NOR gate 116 responds to the binary 1 provided by inverter 117 to condition NAND gate 119 (shown by the binary 1 of FIG. 8I) to invert the negative-going pulse (FIG. 8K) which triggers multivibrator 130 to its unstable condition. Hence, the ADSLCT gating signal now is triggered to its binary 0 level, as shown in FIG. 8M. It is recalled that this initiates a read-out cycle for RAM 101.

While the ADSLCT signal is a binary 0, the next write clock pulse $WC_2$ occurs at time $t_7$. This triggers multivibrator 122 to its unstable state resulting in the MARK signal (FIG. 8B). However, the binary 0 provided by the ADSLCT signal inhibits NAND gate 120 from triggering multivibrator 124, thereby preventing gating signal $\overline{WE}$ from being produced. When the ADSLCT signal returns to a binary 1 at time $t_8$ (FIG. 8M), the MARK signal still is a binary 1 so that NAND gate 120 produces a negative transition (FIG. 8N) to trigger multivibrator 124 (FIG. 8O) for the appropriate write address "set-up"0 time $t_{SA}$. This multivibrator returns to its stable condition at time $t_9$ to trigger multivibrator 126 (FIG. 8E) which produces the gating signal $\overline{WE}$ (FIG. 8D).

The continuing operation of the illustrated gate signal generator is substantially the same as described above. Thus, at time $t_{10}$ the $\overline{WE}$ gating signal terminates and the differentiated pulse WEΔ is produced, but this pulse does not trigger multivibrator 128 because the binary 0 provided by the MARK signal inhibits NAND gate 115 from applying a triggering pulse to the multivibrator. Subsequently, the next read clock pulse $RC_3$ occurs at time $t_{11}$ (FIG. 8C), and is transmitted through NAND gate 118 (FIG. 8J) and NAND gate 119 (FIG. 8K) to trigger multivibrator 130, thereby producing the binary 0 ADSLCT signal (FIG. 8M) once again. The next write clock pulse $WC_3$ occurs at time $t_{12}$ when the ADSLCT signal is a binary 0 and, therefore, production of the gating signal $\overline{WE}$ for initiating a write-in cycle is delayed until the ADSLCT signal returns to a binary 1 at time $t_{13}$. In the interest of brevity, further description of the operation of this gate signal generator is not provided.

Therefore, it is appreciated that the initiation of a write cycle generally follows the occurrence of a write clock pulse WC, but is delayed in the event that a read cycle is being performed until that read cycle is completed. Similarly, a read cycle generally is initiated following a read clock pulse RC, but is delayed in the event that a write cycle is being performed until that write cycle is completed. As represented by the ADSLCT signal (FIG. 8M) from time $t_4$ to time $t_8$, two successive read cycles may be performed if two successive read clock pulses RC are produced without an intermediary write clock pulse.

Reproducing Operation

The operation of the gate signal generator shown in FIG. 7 during reproducing is very similar to the just-described recording operation, except that the repetition rate of the write clock pulse WC is faster than that of the read clock pulses RC. Characteristic waveform diagrams showing this reproducing operation are illustrated in FIGS. 9A–9O. It is assumed that at time $t_1$ all of the monostable multivibrators are in their stable conditions and the first write clock pulse $WC_1$ is produced. Accordingly, the MARK signal is triggered to a binary 1 (FIG. 9B) which, in turn, actuates NAND gate 120 (FIG. 9N) to trigger multivibrator 124, thereby producing signal $t_{SA}$ (FIG. 9O) to establish the address "set up" interval. This interval terminates at time $t_2$ to trigger multivibrator 126 (FIG. 9E), resulting in the gating signal $\overline{WE}$ (FIG. 9D). When this gating signal is completed at time $t_3$, the differentiated pulse WEΔ (FIG. 9F) is produced and is transmitted through NAND gate 115 (which is enabled by the binary 1 MARK signal) as a negative-going pulse (FIG. 9G) to trigger multivibrator 128 (FIG. 9H).

Coincidentally, the first clock pulse $RC_1$ also is produced at time $t_3$, but since the $\overline{MARK}$ signal is a binary 0 (MARK signal is a binary 1), the read clock pulse cannot pass through NAND gate 118 (FIG. 9J). Thus, read read clock pulse $RC_1$ is inhibited from triggering multivibrator 130. However, at time $t_4$ multivibrator 128 returns to its stable condition and its trailing edge is differentiated to form the negative-going pulse MM4QΔ (FIG. 9I) which is inverted by NAND gate 118 (FIG. 9K) to trigger multivibrator 130. Hence, the ADSLCT gating signal is triggered to a binary 0 to initiate a read cycle.

At time $t_5$ the ADSLCT signal returns to a binary 1 to terminate the read cycle. Concidentally, the next write clock pulse $WC_2$ occurs at this time to trigger the MARK signal to a binary 1. Accordingly, both the ADSLCT and MARK signals are binary 1's so that multivibrator 124 is triggered (FIG. 9O) to initiate another write cycle, as described above, during which gating signal $\overline{WE}$ (FIG. 9D) is produced. This gating signal terminates at time $t_7$ while the MARK signal still is a binary 1. Therefore, the differentiated pulse WEΔ (FIG. 9F) passes through NAND gate 115 (which is enabled by the MARK signal), as shown in FIG. 9G to trigger multivibrator 128 (FIG. 9H). When this multivibrator returns to its stable state at time $t_8$, its trailing edge is differentiated (FIG. 9I) and the differentiated pulse MM4QΔ is transmitted by NAND gate 119 (FIG. 9K), which is enabled by the binary 1 supplied thereto by NAND gate 118 (FIG. 9J), to multivibrator 130. Consequently, the ADSLCT signal is triggered to a binary 0 (FIG. 9M).

After the MARK signal returns to a binary 0, the next read clock pulse $RC_2$ occurs at time $t_9$ (FIG. 9C). NAND gate 118, which is enabled by the binary 0 MARK signal, responds to read clock pulse $RC_2$ (FIG. 9J) to supply a negative-going pulse to NAND gate 119 which, in turn, inverts this pulse (FIG. 9K) to retrigger multivibrator 130. This has the effect of increasing the duration that this retriggerable multivibrator maintains its unstable condition. Thus, when the next write clock pulse $WC_3$ is produced at time $t_{10}$, the fact that the ADSLCT signal still is a binary 0 inhibits the MARK signal (produced by write clock pulse $WC_3$) from triggering multivibrator 124. That is, since write clock pulse $WC_3$ occurs when a read cycle is being performed (as represented by the binary 0 ADSLCT signal), the write cycle is delayed until time $t_{11}$, i.e., the time that the ADSLCT signal returns to a binary 1, as shown in FIG. 9O.

The gate signal generator continues to operate in the manner described above so as to initiate write cycles in response to write clock pulses and read cycles in response to read clock pulses. Of course, if a write clock pulse occurs during a read cycle, as at time $t_{10}$, generation of the gating signal $\overline{WE}$ (which enables a write operation) is delayed until after the read cycle is completed. Also, although a read cycle normally is enabled following termination of the gating signal $\overline{WE}$, as at time $t_{14}$, the read cycle interval is extended if a read clock pulse RC next precedes a write clock pulse WC, as at time $t_{15}$. As represented by the ADSLCT signal (FIG. 9M) from time $t_{17}$ to time $t_{23}$, two successive write cycles may be performed if two successive write clock pulses $WC_4$ and $WC_5$ are produced without an intermediary read clock pulse.

The present invention has been particularly shown and described with reference to a preferred embodiment wherein an addressable memory device is controlled so as to write pulse data into and read pulse data out of addressable locations independently of each other and at substantially the same time. Simultaneous write and read operations are prevented since this would present the memory device with an ambiguous condition. Rather, a write or a read operation may be delayed in the event that one is in progress at the intended time of occurrence of the other. A change in the time axis of the pulse data is achieved if the write and read operations are performed at different rates. If desired, one of ordinary skill in the art will recognize that various changes and modifications in form and details of the aforedescribed invention are apparent. For example, the address "set up", write and "hold" times are related to the particular memory device which is used. Depending upon that memory device, these times may be varied or even omitted. It is intended that the appended claims be interpreted to include these and other such obvious changes.

What is claimed is:

1. A memory and memory control apparatus therefor adapted to write pulse coded data into addressable locations at one rate and to read pulse coded data from other addressable locations at another rate, the write and read operations being performed substantially independently of each other, comprising:

a memory having plural addressable locations whereat pulse coded data are stored, respectively;

write address generating means for generating selected addresses corresponding to said addressable locations of said memory;

read address generating means for generating selected addresses corresponding to said addressable locations of said memory;

means for supplying pulse coded data;

clock pulse generating means for generating write clock pulse signals at a first rate and read clock pulse signals at a second rate different from said first rate;

write-in means for writing said pulse coded data into said memory at locations therein determined by said write address generating means during write intervals determined by said write clock pulse signals;

read-out means for reading pulse coded data out of said memory from locations therein determined by said read address generating means at read intervals determined by said read clock pulse signals; and means for selectively enabling a write-in and read-out operation during said write and read intervals, respectively, depending upon the time of occurrence of said write and read clock pulse signals with respect to each other.

2. The apparatus of claim 1 wherein said selectively enabling means comprises means responsive to each write clock pulse signal to define a timing interval comprised of a predetermined first portion and a second portion; first gating means responsive to said first portion of said timing interval for actuating said write-in means to write said pulse coded data into said memory; and second gating means enabled by said second portion of said timing interval and responsive to each read clock pulse signal for actuating said read-out means to read said pulse coded data out of said memory and to inhibit said first gating means for a preselected time duration.

3. The apparatus of claim 2 wherein said first gating means includes write pulse generating means for generating a write gate pulse of pre-established duration to actuate said write-in means; and wherein said second gating means includes read gate pulse generating means being energized to generate a read gate pulse of said preselected time duration in response to the occurrence of said read clock pulse signal during said second portion of said timing interval and being further energized by the termination of said write gate pulse.

4. The apparatus of claim 3 further comprising means for supplying said first gating means with said read gate pulse to inhibit said write gate pulse generating means from generaing said write gate pulse when said read gate pulse is present.

5. The apparatus of claim 4 wherein each of said write and read gate pulse generating means is comprised of monostable multivibrator means triggered to an unstable condition for generating a respective write and read gate pulse.

6. The apparatus of claim 3 wherein each of said write and read address generating means comprises counting means responsive to a respective write and read clock pulse signal for incrementing the count thereof; and further comprising selecting means coupled to the write and read counting means and selectively responsive to said read gate pulse for producing either the count supplied by said write counting means or the count supplied by said read counting means.

7. The apparatus of claim 6 wherein said write and read address generating means further comprises decoding means coupled to said selecting means and responsive to the count selectively produced thereby to determine a corresponding location in said memory.

8. The apparatus of claim 7 wherein said means for supplying pulse coded data supplies serial bits of data; said write clock pulse signals are generated at the serial bit supply rate; and said decoding means determines each of the data bit locations in said memory.

9. The apparatus of claim 1 wherein said write address generating means comprises write address counting means for counting each of said write clock pulse signals; said read address generating means comprises read address counting means for counting each of said read clock pulse signals; and further comprising selecting means having one set of inputs coupled to said write address counting means, another set of inputs coupled to said read address counting means; a control input coupled to said selectively enabling means, and outputs to which the counts of said write and read address counting means are selectively applied depending upon whether a write-in or a read-out operation is enabled.

10. The apparatus of claim 9 wherein said means for supplying pulse coded data comprises means for supplying pulse coded data serially by bit; and timing means supplied with said serial data bits with said write clock pulse signals for synchronizing said serial data bits to the write clock pulse signal repetition rate.

11. Apparatus for using a video recorder to record pulse encoded data representing audio information having simulated horizontal and vertical synchronizing signals therein, said apparatus being operable on said pulse encoded data and comprising:

a memory having plural addressable locations whereat pulse coded data is stored; and memory control means for controlling the writing of pulse coded data into and the reading out of pulse coded data from said memory, comprising:

clock pulse generating means for generating write clock pulse signals at a first rate and read clock pulse signals at a second rate different from said first rate;

write address generating means responsive to said write clock pulse signals for generating selected addresses of said memory locations intho which pulse coded data is to be written;

read address generating means responsive to said read clock pulse signals for generating selected addresses of said memory location from which pulse coded data is to be read;

write-in means for writing said pulse coded data into said memory at said addresses generated by said write address generating means during write intervals determined by said write clock pulse signals;

read-out means for reading pulse coded data out of said memory from addresses generated by said read address generating means during read intervals determined by said read clock pulses; and means for delaying the relative operation of one of said write-in and read-out means in the event that the other is operating.

12. The apparatus of claim 11 wherein said write address generating means comprises a write address counter for counting said write clock pulse signals; said read address generating means comprises a read address counter for counting said read clock pulse signals; and further comprising selecting means coupled to both said write and read address counters for selectively producing either the count of said write address counter or the count of said read address counter as the location address for said memory.

13. The apparatus of claim 12 wherein said delaying means comprises means responsive to each write clock pulse signal for defining a predetermined write-enable time duration and a read-enable time duration; write gate pulse generating means for generating a write gate pulse during said write-enable time duration; read gate pulse generating means for generating a read gate pulse during each read-enable time duration in response to each read clock pulse signal; first inhibit means coupled to said write gate pulse generating means for inhibiting said write gate pulse while said read gate pulse is generated; and second inhibit means coupled to said read gate pulse generating means for inhibiting said read gate pulse during said write-enable time duration.

14. The apparatus of claim 13 wherein said read gate pulse generating means further comprises means for sensing the termination of said write gate pulse; and means responsive either to said read clock pulse signal generated during said read-enable time duration or to said termination of said write gate pulse for generating said read gate pulse.

15. The apparatus of claim 14 further comprising means for supplying said read gate pulse to said selecting means to cause said selecting means to produce said count of said read address counter as said location address for said memory.

16. The apparatus of claim 15 wherein said read gate pulse generating means includes means for generating the complement of said read gate pulse; and further comprising means for supplying said read gate pulse complement to said selecting means to cause said selecting means to produce said counter of said write address counter as said location address for said memory.

17. The apparatus of claim 16 wherein said means for defining said write-enable and said read-enable time duration comprises first monostable multivibrator means.

18. The apparatus of claim 17 wherein said write gate pulse generating means comprises second monostable multivibrator means triggered by said first monostable multivibrator means; and said first inhibit means comprises first gate means disabled by said read gate pulse to prevent said second monostable multivibrator means from being triggered.

19. The apparatus of claim 18 wherein said read gate pulse generating means comprises third monostable multivibrator means triggered by said read clock pulse signals or to the termination of such write gate pulse; and said second inhibit means comprises second gate means disabled by said first monostable multivibrator means to prevent said third monostable multivibrator means from being triggered by said read clock pulses.

20. The apparatus of claim 16 wherein said write-in means comprises timing means for receiving said pulse coded data and responsive to said write clock pulse signals for synchronizing said pulse coded data to said first rate; and write-in gates for receiving said synchronized pulse coded data and responsive to said write gate pulse to write said synchronized pulse coded data into said memory.

21. The apparatus of claim 20 wherein said read-out means includes gating means responsive to said read gate pulse; and retiming means for receiving the output of said last-mentioned gating means and responsive to said read clock pulse signals for synchronizing said pulse coded data to said second rate.

22. The apparatus of claim 21 further including means for reproducing said pulse coded data and said simulated horizontal and vertical synchronizing signals from said magnetic medium; means for supplying said reproduced pulse coded data to said timing means included in said write-in means; converter means for converting said pulse coded data to analog form; and means for supplying the pulse coded data synchronized to said second rate by said retiming means to said converter means.

23. The apparatus of claim 22, further comprising means for selectively establishing a recording or reproducing mode of operation; and wherein said clock pulse generating means generates write clock pulse signals at a slower rate than said read clock pulse signals during a recording operation and at a faster rate than said read clock pulse signals during a reproducing operation.

24. The apparatus of claim 22 wherein said pulse coded data is written into and read out from said memory serially by bit; and wherein each addressable memory location stores a single data bit.

25. A method of controlling an addressable memory to change the repetition rate of pulse coded data bits supplied thereto, comprising the steps of:
generating write clock pulses having a repetition rate equal to the repetition rate at which said pulse coded data bits are supplied;
generating read clock pulses having a different repetition rate;
generating bit write addresses in synchronism with the repetition rate of said write clock pulses;
generating bit read addresses in synchronism with the repetition rate of said read clock pulses;
establishing a write cycle during the interval between successive write clock pulses to write said supplied data bit into the memory at the generated bit write address;
establishing read cycle during the interval between successive read clock pulses to read a data bit out of said memory from the generated bit read address; and
delaying the relative occurrences of one of said read and write cycles in the event that the other cycle is being performed.

26. The method of claim 25 wherein said step of establishing a write cycle comprises generating a write-in gate pulse in response to a write clock pulse; and gating a data bit into said memory during the duration of said write-in gate pulse.

27. The method of claim 26 wherein said step of establishing a read cycle comprises generating a read-out gate pulse in response to a read clock pulse; applying the generated bit read address to said memory during the duration of said read-out gate pulse to read a data bit out of said memory; and transmitting said read-out data bit in response to said read-out gate pulse.

28. The method of claim 27 wherein said step of delaying comprises generating a periodic pulse of predetermined duration in response to each write clock pulse; inhibiting said read-out gate pulse from being generated during said periodic pulse duration; and inhibiting said write-in gate pulse from being generated during the duration of said read-out gate pulse.

29. The method of claim 28 wherein said write-in gate pulse is generated when said periodic pulse is generated and said read-out gate pulse is not generated.

30. The method of claim 28 comprising the further step of also generating said read-out gate pulse at the conclusion of said write-in gate pulse and extending the duration of said read-out gate pulse in response to the next read clock pulse.

31. The method of claim 30 comprising the further step of synchronizing the transmitted data bits read out of said memory with said read clock pulses.

32. The method of claim 28 comprising the further steps of generating a complementary read-out gate pulse; and applying the generated bit write addresss to said memory during the duration of said complementary read-out gate pulse.

33. The method of claim 25 wherein said read clock pulses are generated at a faster rate than said write clock pulses to time-compress the repetition rate of said supplied pulse coded data bits.

34. The method of claim 25 wherein said write clock pulses are generated at a faster rate than said read clock pulses to time-expand the repetition rate of said supplied pulse coded data bits.

* * * * *

UNITED STATES PATENT AND TRADEMARK OFFICE
CERTIFICATE OF CORRECTION

PATENT NO. : 4,141,039
DATED : February 20, 1979
INVENTOR(S) : Kaichi Yamamoto

It is certified that error appears in the above-identified patent and that said Letters Patent are hereby corrected as shown below:

Col. 2, line 58, change "may" to --many--.

Col. 5, line 18, change "(262.5/262.5-20) to

--262.5/(262.5-20)--.

Col. 5, line 24, change "(262.5-20/262.5)" to

--(262.5-20)/262.5--.

Col. 10, line 37, after "Sync" insert --signal--.

Col. 12, line 63, change "$H_D$ are" to --$H_D$ and--.

Col. 13, line 38, change "converter" to --converters--.

Col. 15, line 22, change "detal" to --detail--.

Col. 16, line 7, change "address" to --addresses--.

Col. 18, line 54, change "$t_{RD}$" to --$t_{RC}$--.

Col. 20, line 35, change "WE$\triangle$" to --WE$_\triangle$--.

Col. 20, line 47, change "MM4Q$\triangle$" to --MM4Q$_\triangle$--.

UNITED STATES PATENT AND TRADEMARK OFFICE
CERTIFICATE OF CORRECTION

PATENT NO. : 4,141,039        Page 2 of 3
DATED : February 20, 1979
INVENTOR(S) : Kaichi Yamamoto It is certified that error appears in the above-identified patent and that said Letters Patent are hereby corrected as shown below:

Col. 21, line 24, change "WE△" to --WE$_\triangle$ --, line 28,    "    "    "    "    , line 30,    "    "    "    "

Col. 21, line 33, after "for" insert --a--.

Col. 21, line 38, change "MM4Q△" to --MM4Q$_\triangle$ --, line 51,    "    "    "    "    .

Col. 21, line 62, change "the" to --at--.

Col. 21, line 65, change "a" to --at--.

Col. 21, line 66, change "binaryy" to --binary--.

Col. 22, line 26, delete "0".

Col. 22, line 33, change "WE△" to --WE$_\triangle$ --,

Col. 23, line 11,    "    "    "    "    .

Col. 23, line 16, after "first" insert --read--.

Col. 23, line 24, change "MM4Q△" to --MM4Q$_\triangle$ --.

Col. 23, line 37, change "WE△" to --WE$_\triangle$ --.

UNITED STATES PATENT AND TRADEMARK OFFICE
CERTIFICATE OF CORRECTION

PATENT NO. : 4,141,039
DATED : February 20, 1979
INVENTOR(S) : Kaichi Yamamoto

It is certified that error appears in the above-identified patent and that said Letters Patent are hereby corrected as shown below:

Col. 23, line 43, change "$MM4Q\Delta$" to --$MM4Q_\Delta$--.

Col. 24, line 68, change "time" to --times--.

Col. 25, line 17, after "write" insert --gate--.

Col. 26, line 4, after "bits" insert --and--.

Col. 26, line 23, change "intho" to --into--.

Col. 27, line 17, change "duration" to --durations--.

Col. 28, line 19, after "establishing" insert --a--.

Signed and Sealed this

Twenty-fifth Day of September 1979

[SEAL]

Attest:

LUTRELLE F. PARKER

*Attesting Officer*   *Acting Commissioner of Patents and Trademarks*